United States Patent
Chen et al.

(10) Patent No.: US 11,467,335 B2
(45) Date of Patent: Oct. 11, 2022

(54) OPTICAL FIBERS FOR SINGLE MODE AND FEW MODE VERTICAL-CAVITY SURFACE-EMITTING LASER-BASED OPTICAL FIBER TRANSMISSION SYSTEMS

(71) Applicant: CORNING INCORPORATED, Corning, NY (US)

(72) Inventors: Xin Chen, Painted Post, NY (US); Kangmei Li, Painted Post, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 71 days.

(21) Appl. No.: 16/930,811

(22) Filed: Jul. 16, 2020

(65) Prior Publication Data
US 2021/0026063 A1 Jan. 28, 2021

Related U.S. Application Data

(60) Provisional application No. 62/876,962, filed on Jul. 22, 2019.

(51) Int. Cl.
*G02B 6/02* (2006.01)
*G02B 6/036* (2006.01)
(Continued)

(52) U.S. Cl.
CPC ....... *G02B 6/02042* (2013.01); *G02B 6/0281* (2013.01); *G02B 6/0365* (2013.01);
(Continued)

(58) Field of Classification Search
CPC .............. G02B 6/02042; G02B 6/0281; G02B 6/03633; G02B 6/0365; G02B 6/03661;
(Continued)

(56) References Cited

U.S. PATENT DOCUMENTS

| | | | |
|---|---|---|---|
| 6,885,802 B2 | 4/2005 | Oliveti et al. | |
| 8,588,569 B2* | 11/2013 | Bookbinder | G02B 6/03638 385/124 |
| 8,666,214 B2 | 3/2014 | Bookbinder et al. | |
| 8,891,925 B2* | 11/2014 | Bickham | G02B 6/0365 385/127 |

(Continued)

OTHER PUBLICATIONS

Kao et al., "Comparison of single-/few-/multi-mode 850 nm VCSELs for optical OFDM transmission", Optics Express, vol. 25, No. 14: 16347, Jul. 2017, 17 pages.

*Primary Examiner* — Abbas H Alagheband
(74) *Attorney, Agent, or Firm* — Kevin L. Bray

(57) ABSTRACT

The optical fibers disclosed have single mode and few mode optical transmission for VCSEL-based optical fiber transmission systems. The optical fibers have a cable cutoff wavelength $\lambda_C$ of equal to or below 1260 nm thereby defining single mode operation at wavelengths greater than 1260 nm and few-mode operation at wavelengths in a wavelength range from 800 nm and 1100 nm. The mode-field diameter is in the range from 8.0 microns to 10.1 microns at 1310 nm. The optical fibers have an overfilled bandwidth OFL BW of at least 1 GHz·km at at least one wavelength in the wavelength range. The optical fibers have a single-step or two-step core and can have a trench refractive index profile. VCSEL based optical transmission systems and methods are disclosed that utilize both single core and multicore versions of the optical fiber.

10 Claims, 17 Drawing Sheets

(51) Int. Cl.
*H04B 10/66* (2013.01)
*G02B 6/028* (2006.01)
*H04B 10/25* (2013.01)
*H04B 10/50* (2013.01)

(52) U.S. Cl.
CPC ..... *G02B 6/03633* (2013.01); *G02B 6/03661* (2013.01); *H04B 10/25* (2013.01); *H04B 10/503* (2013.01); *H04B 10/66* (2013.01)

(58) Field of Classification Search
CPC ...... G02B 6/262; G02B 6/421; G02B 6/4246; G02B 6/4249; H04B 10/25; H04B 10/503; H04B 10/66
USPC ......................................................... 398/116
See application file for complete search history.

(56) References Cited

U.S. PATENT DOCUMENTS

| | | | |
|---|---|---|---|
| 2007/0196061 A1* | 8/2007 | Bickham | G02B 6/02223 385/123 |
| 2008/0310805 A1* | 12/2008 | Sugizaki | G02B 6/03644 385/115 |
| 2014/0119701 A1* | 5/2014 | Chen | G02B 6/0281 385/124 |
| 2015/0309250 A1* | 10/2015 | Bickham | G02B 6/42 385/124 |
| 2015/0338578 A1* | 11/2015 | Bickham | G02B 6/26 29/592.1 |
| 2017/0160466 A1* | 6/2017 | Imamura | G02B 6/0288 |
| 2017/0192169 A1* | 7/2017 | Kitamura | G02B 6/0365 |
| 2018/0003890 A1* | 1/2018 | Bickham | G02B 6/0288 |
| 2018/0202843 A1* | 7/2018 | Artuso | G02B 6/02042 |

* cited by examiner

OPTICAL FIBERS FOR SINGLE MODE AND FEW MODE VERTICAL-CAVITY SURFACE-EMITTING LASER-BASED OPTICAL FIBER TRANSMISSION SYSTEMS

This application claims the benefit of priority under 35 U.S.C. § 119 of U.S. Provisional Application Ser. No. 62/876,962 filed on Jul. 22, 2019 the content of which is relied upon and incorporated herein by reference in its entirety.

BACKGROUND

Field

The present disclosure relates to optical fibers and in particular relates to optical fibers for single mode and few mode vertical-cavity surface-emitting laser (VCSEL)-based optical fiber transmission systems.

Background

Standard single mode (SM) fiber is the preferred optical fiber for use in hyperscale data centers because it has more bandwidth than multimode (MM) fibers, thereby providing higher data rates and longer distance data transmission. On the other hand, hyperscale data centers also utilize relatively short data links, e.g., from 1 meter to 100 meters. In this distance range, MM fiber systems with MM vertical-cavity surface-emitting laser (VCSEL) transceivers offer lower cost solutions with lower power consumption. In practice, some hyperscale data centers use standard SM fiber for both long and short data links to simplify the fiber cable management. In other words, the cost savings and operational benefits associated with using MM fiber for the short data links does not outweigh the additional costs and complexity associated with the fiber cable management issues of dealing with two different types of fiber cables. In addition, it is not clear if MM fiber can support future generation of optical transmission at higher data rate such as supporting 800G based on using 100G PAM4 as a building block. Note that currently at 400G transmission, the building block is 50G PAM4 transmission.

The fiber cable management issues can be avoided if low-cost optical transmission can be performed over the SM fiber for the short distance links. VCSELs that emit SM or few mode (FM) light offer the promise of better system performance than MM VCSELs, due to the smaller impact of modal dispersion effects since fewer modes are excited in the fiber. The SM or FM VCSELs are made using a platform and process similar to that used to form MM VCSELs so that their respective costs are about the same. On the other hand, the lower numerical aperture (NA) and smaller spot size of the light emission from SM and FM VCSELs make them more suitable for launching into smaller core optical fibers, i.e., SM fibers.

In recent years, the design and the technology of making SM VCSELs have reached the level that SM VCSELs can also have similar optical power to MM VCSELs. In addition, a SM VCSEL has a much narrower laser linewidth than a MM VCSEL, e.g., narrower than 0.2 nm, or in some cases narrower than 0.1 nm and in some cases even narrower than 0.07 nm. In contrast, MM VCSELs typically have laser linewidths ranging from 0.3 nm to 0.65 nm, which gives rise to chromatic dispersion effects that limit the bandwidth performance of the system when using MM fiber.

VCSELs for optical fiber data transmission typically operate at 850 nm, but VCSELs can be made to operate within a wavelength range between 800 nm and 1100 nm. In this wavelength range, a standard SM fiber designed for SM operation at wavelengths above 1300 nm can support a few modes. A SM or FM VCSEL can couple to such a fiber with relatively low insertion loss. However, the bandwidth of standard SM fibers within the 800 nm to 1100 nm wavelength range is too low to be suitable for high data rate transmission. To enable the SM or FM VCSEL transmission over a SM fiber, a SM fiber with bandwidth optimized for use in the wavelength range of 800 nm to 1100 nm is needed.

BRIEF SUMMARY

The present disclosure is directed to optical fibers having single mode and few mode optical transmission for VCSEL-based optical fiber transmission systems. The disclosed optical fibers have a cable cutoff wavelength $\lambda_C$ of equal to or below 1260 nm thereby defining single mode operation at a wavelength in a first wavelength range greater than 1260 nm and few-mode operation at a wavelength in a second wavelength range from 800 nm and 1100 nm. The mode-field diameter is in the range from 8.0 microns to 10.1 microns at 1310 nm. The optical fibers have an overfilled bandwidth (OFL BW) of at least 1 GHz·km. The optical fibers have a single-step or two-step core and can have a trench in the refractive index profile. VCSEL based optical transmission systems and methods are disclosed that utilize both single core and multicore versions of the optical fiber.

The optical fibers disclosed herein are compatible with existing standard SM fiber and can be used for short-length distance data transmission but also can be used for long-distance transmission. The SM fibers can be made using standard optical fiber preform making processes and drawing techniques and is anticipated to have substantially the same fabrication cost.

One aspect of the description discloses: An optical fiber, comprising: a core having a step index profile, comprising: an inner core region having a first relative refractive index and a first radius, and an outer core region surrounding the inner core region, having a second relative refractive index less than the first relative refractive index, and a second radius greater than the first radius; and a cladding surrounding the core; wherein the optical fiber is single mode at wavelengths greater than 1260 nm, and is few mode in a wavelength range between 800 to 1100 nm with an overfilled bandwidth greater than 1 GHz·km at least one wavelength in the wavelength range.

Another aspect of the description discloses: A multicore optical fiber, comprising: a cladding matrix; and two or more core sections embedded within the cladding matrix, wherein each core section has a step index profile, comprising: an inner core region having a first relative refractive index, and a first radius, and an outer core region surrounding the inner core region, having a second relative refractive index less than the first relative refractive index, and a second radius greater than the first radius; wherein each core section is single mode at wavelengths greater than 1260 nm, and is few mode in a wavelength range between 800 to 1100 nm with an overfilled bandwidth greater than 1 GHz·km at at least one wavelength in the wavelength range.

In some embodiments, the overfilled bandwidth is at least 2 GHz·km, or at least 5 GHz·km, or at least 10 GHz·km at the at least one wavelength in the wavelength range. In some embodiments, the optical fiber has a cable cutoff wavelength $\lambda_C$ between 1160 nm and 1260 nm, and has a mode-field diameter between 8.0 µm and 10.1 µm at 1310 nm.

Another aspect of the description discloses: An optical fiber data transmission system comprising: an optical fiber link comprising the optical fiber of Clause 1 or 6, wherein the optical fiber link has an input end, an output end and a link length less than 1000 meters; a transmitter comprising a vertical-cavity surface-emitting laser that emits light having a wavelength in the wavelength range and that carries optical signals at a data rate of at least 10 Gb/s, wherein the vertical-cavity surface-emitting laser is optically coupled to the input end of the optical fiber link; and a receiver comprising a photodetector optically coupled to the output end of the optical fiber link and configured to receive the optical signals and convert the optical signals to electrical signals.

In some embodiments, the data rate is at least 25 Gb/s and the link length less than 500 m. In some other embodiments, the data rate is at least 50 Gb/s and the link length is less than 300 m. In some embodiments, the optical signals are modulated using either a non-return-to-zero modulation format or a four-level pulse-amplitude modulation format.

Another aspect of the description discloses: A method of transmitting optical data, comprising: using a vertical cavity surface-emitting laser to generating optical data signals at a data rate of at least 10 Gb/s; transmitting the optical data signals over an optical fiber link comprising an optical fiber of claim 1 or claim 6; and receiving the optical signals at a photodetector configured to convert the optical signals into electrical signals representative of the optical signals.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
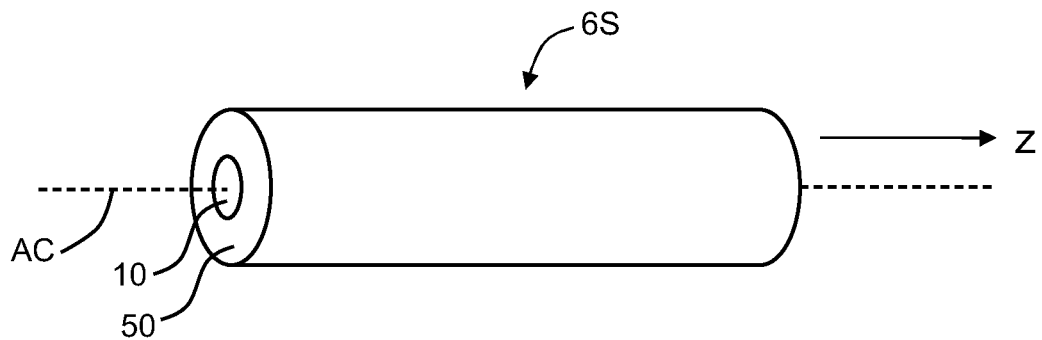
FIG. 1 is a side elevated view of a section of a single-core optical fiber, according to some embodiments.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

As used herein, "comprising" is an open-ended transitional phrase. A list of elements following the transitional phrase "comprising" is a non-exclusive list, such that elements in addition to those specifically recited in the list may also be present.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

The term "wherein" is used as an open-ended transitional phrase, to introduce a recitation of a series of characteristics of the structure.

Cartesian coordinates are used in some of the Figures for the sake of reference and ease of illustration and are not intended to be limiting as to direction or orientation. The z-direction is taken as the axial direction of the optical fiber.

The acronym VCSEL stands for "vertical cavity surface emitting laser."

The term "fiber" as used herein is shorthand for optical fiber.

The coordinate r is a radial coordinate, where r=0 corresponds to the centerline of the fiber. The term "radius" refers to a value of the radial coordinate.

The term "core" as used herein is a core region of an optical fiber, representing a cylinder of material that runs along the optical fiber's length. The core is characterized by its radius of cross-sectional area corresponding to confinement (e.g. 99%) of optical intensity in the optical fiber. The core is surrounded by a medium with a lower index of refraction, typically a cladding region. Light travelling in the core reflects from the core-cladding boundary due to total internal reflection, as long as the angle between the light and the boundary is greater than the critical angle. As a result, the optical fiber transmits all rays that enter the fiber with a sufficiently small angle to the optical fiber's axis.

The term "core radius" as used herein is referred to geometric core radius which is determined from the refractive index profile and is independent of wavelength.

The symbol "µm" is used as shorthand for "micron," which is a micrometer, i.e., $1\times10^{-6}$ meter.

The symbol "nm" is used as shorthand for "nanometer," which is $1\times10^{-9}$ meter.

The limits on any ranges cited herein are inclusive and thus to lie within the range, unless otherwise specified.

The terms "comprising," and "comprises," e.g., "A comprises B," is intended to include as a special case the concept of "consisting," as in "A consists of B."

The phrase "bare optical fiber" or "bare fiber" as used herein means an optical fiber directly drawn from a heated glass source (i.e., a "preform") and prior to applying a protective coating layer to its outer surface (e.g., prior to the bare optical fiber being coated with a polymeric-based material), according to some embodiments.

In some embodiments, the "relative refractive index" as used herein is defined as:

$$\Delta\% = 100\frac{n^2(r) - n_{cl}^2}{2n^2(r)}$$

where n(r) is the refractive index of the fiber at the radial distance r from the fiber's centerline AC (r=0) at a wavelength of 1550 nm, unless otherwise specified, and $n_{cl}$ is the index of the outer cladding at a wavelength of 1550 nm. In one example, when the outer cladding is essentially pure silica, $n_{c1}$=1.444 at a wavelength of 1550 nm.

In some embodiments, the relative refractive index percent (also referred herein as the "relative refractive index" for short) is represented by $\Delta$(or "delta"), $\Delta\%$ (or "delta %"), or %, all of which can be used interchangeably, and its values are given in units of percent or %, unless otherwise specified. Relative refractive index is also expressed as $\Delta(r)$ or $\Delta(r)$ %.

In some embodiments, the refractive index of a region is less than the reference index $n_{c1}$, the relative index percent is negative and is referred to as having a depressed region or depressed-index (also referred to as a "trench"), and the minimum relative refractive index is calculated at the point at which the relative index is most negative unless otherwise specified. In some embodiments where the refractive index of a region is greater than the reference index $n_{cl}$, the relative index percent is positive and the region can be said to be raised or to have a positive index.

In some embodiments, the term "dopant" refers to a substance that changes the relative refractive index of glass relative to pure un-doped $SiO_2$. In some embodiments, one or more other substances that are not dopants may be present in a region of an optical fiber (e.g., the core) having a positive relative refractive index $\Delta$. In some embodiments, the dopants used to form the core of the optical fiber disclosed herein include $GeO_2$ (germania), $Al_2O_3$ (alumina), and the like. Dopants that increase the relative refractive index of glass relative to pure un-doped $SiO_2$ are referred to as up-dopants and dopants that decrease the relative refractive index of glass relative to pure un-doped $SiO_2$ are referred to as down-dopants. Glass that contains an up-dopant is said to be "up-doped" relative to pure un-doped $SiO_2$ and glass that contains a down-dopant is said to be "down-doped" relative to pure un-doped $SiO_2$. When comparing two doped glasses, the doped glass having the higher relative refractive index is said to be up-doped relative to the doped glass having a lower relative refractive index and the doped glass having the lower relative refractive index is said to be down-doped relative to the doped glass having the higher relative refractive index.

In some embodiments, the parameter α (also called the "profile parameter" or "alpha parameter") relates to the relative refractive $\Delta(r)$ where r is the radius (radial coordinate), and which is defined by:

$$\Delta(r)=\Delta_0\{1-[(r-r_m)/(r_0-r_m)]^\alpha\}$$

where $r_m$ is the point where $\Delta(r)$ is the maximum $\Delta_0$, $r_0$ is the point at which $\Delta(r)=0$ and r is in the range $r_i$ to $r_f$, where $\Delta(r)$ is defined above, $r_i$ is the initial point of the α-profile, $r_f$ is the final point of the α-profile and α is an exponent that is a real number. For a step index relative refractive profile, α>10, and for a gradient relative refractive index profile, α<5.

In some embodiments, the "trench volume" is denoted by V and is defined for a trench with a relative refractive index $\Delta_3$ as a constant $\Delta_{3min}$:

$$V=\Delta_{3min}\cdot[(r_3)^2-(r_2)^2].$$

In an example where the relative refractive index $\Delta_3$ varies with radial coordinate (i.e., $\Delta_3(r)$), then the trench volume is given by $$V=2\int\Delta_3(r)rdr$$

with the limits on the integration being from $r_2$ to $r_3$ and the units are in %-μm². The symbol |V| is used to denote the absolute value of the trench volume.

In some embodiments, the "mode field diameter" or "MFD" of an optical fiber is determined using the Peterman II method, which is the current international standard measurement technique for measuring the MFD of an optical fiber. The MFD is given by:

$$MFD = 2w$$

$$w = \left[2\frac{\int_0^\infty (f(r))^2 rdr}{\int_0^\infty \left(\frac{df(r)}{dr}\right)^2 rdr}\right]^{1/2}$$

where f(r) is the transverse component of the electric field distribution of the guided optical signal and r is radial position in the fiber. The MFD depends on the wavelength of the optical signal and is reported herein for wavelengths of 850 nm, 980 nm, 1060 nm, 1310 nm, and/or 1550 nm.

In some embodiments, the "effective area" of an optical fiber is defined as:

$$A_{eff} = \frac{2\pi\left[\int_0^\infty (f(r))^2 rdr\right]^2}{\int_0^\infty (f(r))^4 rdr}$$

where f(r) is the transverse component of the electric field of the guided optical signal and r is radial position in the fiber. In some embodiment, the effective area" or "$\Delta_{eff}$" depends on the wavelength of the optical signal and is understood to refer to wavelengths of 1310 nm and 1550 nm.

In some embodiments, the zero-dispersion wavelength is denoted $\lambda_0$ and is the wavelength where material dispersion and waveguide dispersion cancel each other. In some embodiments, in silica-based optical fibers, the zero-dispersion wavelength is about 1310 nm, e.g., between 1300 and 1320 nm, depending on the dopants and refractive index profile used to form the optical fiber.

In some embodiments, the operating wavelength is denoted by λ and is a wavelength at which the optical fiber is designed to function. In the discussion below, the disclosed fiber has one operating wavelength for SM operation and another operating wavelength for few mode operation, and which operating wavelength is being referred to will be apparent from the discussion. In some embodiments, the operating wavelength is also referred to as just the wavelength unless the context of the discussion requires distinguishing from other wavelengths.

In some embodiments, the term "SM" when referring to an optical fiber means that the optical fiber supports a single linear polarized (LP) mode at the (SM) operating wavelength.

In some embodiments, the term "few mode" or "few moded" refers to an optical fiber that supports two or three LP modes or mode groups, at the given (few mode) operating wavelength.

In some embodiments, the cable cutoff wavelength is denoted $\lambda_C$ and is the minimum wavelength beyond which the optical fiber will support practically only one propagating mode. For wavelengths below (less than) the cable cutoff wavelength $\lambda_C$, MM or FM transmission may occur and an additional source of modal dispersion may arise to limit the fiber's information carrying capacity. In some embodiments, a fiber cutoff wavelength $\lambda_{CF}$ is based on a 2-meter fiber length while the cable cutoff wavelength $\lambda_C$ is based on a 22-meter cabled fiber length. The 22-meter cable cutoff wavelength $\lambda_C$ is typically less than the 2-meter fiber cutoff wavelength $\lambda_{CF}$ due to higher levels of bending and mechanical pressure in the cable environment. Thus, the SM operating wavelength λ has a lower limit of $\lambda_C$. In the discussion below, the cable cutoff wavelength $\lambda_C$ is equal to or below 1260 nm, and further in an example is in the wavelength range from 1160 nm to 1260 nm.

In some embodiments, the overfilled launch bandwidth is denoted OFL BW and measured in units of MHz·km or GHz·km. For the bandwidth measurement, all the propagating modes are excited with comparable weights, which is essentially the overfilled launch bandwidth.

In some embodiments, the effective modal bandwidth is denoted EMB BW and is also measured in units of MHz·km or GHz·km. The EMB BW is the actual modal bandwidth observed in a link for a specific fiber with a specific source. The EMB BW is defined with the assumptions of the IEEE P802.3ae link model.

In some embodiments, the abbreviation "b-b" stands for "back-to-back."

In some embodiments, it is noted that a standard step-index SM fiber can be few moded (i.e., can support two or three mode groups) below the cable cutoff wavelength $\lambda_C$ (e.g., 1310 nm), but as emphasized herein, the OFL BW and the EMB BW bandwidths for few-mode operation are too low for practical use in data center applications.

Properties of Standard SM and MM Optical Fibers

In some embodiments, the standard SM optical fiber as optical properties according to the G.652 industry standards known in the art and as set forth by Telecommunication Industry Association (TIA). In one example, a standard SM optical fiber has a relatively small core of about 9 microns in diameter and a numerical aperture (NA) of about 0.12. In some embodiments, a standard SM fiber is designed to have a cable cutoff wavelength $\lambda_C$ below (i.e., less than) 1260 nm so the fiber supports only one mode at 1310 nm and supports a few modes at 850 nm. Typically, a standard SM fiber has a step index profile associated with a very high alpha parameter (e.g., $\alpha \geq 10$). The step index profile is simple, but the bandwidth at 850 nm is low. Consequently, a standard SM fiber with a step index profile is not suitable for MM (including few-mode) transmission at 850 nm. An example standard SM optical fiber is Corning® SMIF-28®, available from Corning, Inc., Corning, N.Y.

By comparison, in some embodiments a MM fiber has a relatively large core of 50 microns or 62.5 microns in diameter and an NA of equal to or greater than about 0.2. In some embodiments, standard MM optical fibers are denoted OM1 through OM5 and have select optical properties according to aforementioned industry standards. Due to modal dispersion, the maximum achievable EMB bandwidth of such MM fibers is no more than 10-20 GHz·km.

In some embodiments, Table 1 below provides a comparison of different MM and SM optical fibers for short reach applications. In Table 1, the overfilled launch bandwidth (OFL BW) and the effective modal bandwidth (EMB BW) are each measured in MHz·km, and the link distance d in the last row stands for "2 to 10 km at 1310 nm." The symbol "G" refers to data rate in units of Gb/s. The symbol "N/A" stands for "not applicable." The acronym SMF stands for "SM fiber," while the acronyms OM1 through OM5 represents different industry standard MM fibers. In the table, "*" means that the measurement is for short wavelength division multiplexing (SWDM) using four wavelengths of 850, 880, 910 and 940 nm.

In some embodiments, the single-core fiber 6S is simply referred to as "fiber" 6S, while the example multicore optical fiber discussed further below is referred to as "multicore fiber" 6M.

In some embodiments, the fiber 6S has a centerline AC shown by way of example as running in the z-direction. The fiber 6S comprises a glass core region ("core") 10 that is centered on the centerline AC. The core 10 can be immediately surrounded by a glass cladding region ("cladding") 50.

Figure 2:
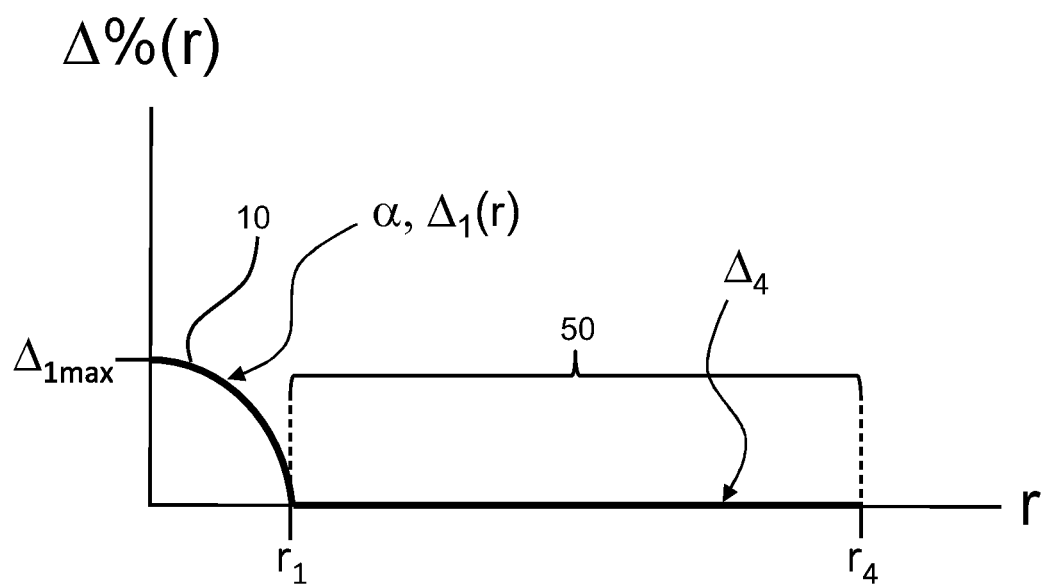
FIG. 2 is an example relative refractive index profile of a single-core optical fiber, according to some embodiments.

FIG. 2 is a graded index profile or alpha-profile plot of an exemplary physical configuration of a SC fiber, according to some embodiments. For example, the graded-index profile shows relative refractive index $\Delta(r)$ versus the radial coordinate ("radius") r of exemplary physical configuration of fiber 6S. In some embodiments, the fiber 6S is SM above a cable cutoff wavelength greater than $\lambda_C = 1260$ nm. The fiber 6S can also be configured to have few modes and have a sufficiently high BW for short-distance data communication links at the at least one wavelength in a range between 800 nm to 1100 nm.

In some embodiments, the core 10 has a radius $r_1$ between 5 μm and 7 μm, a graded index as defined by an alpha value a in the range from $2 \leq \alpha \leq 3$, and a maximum relative refractive index $\Delta_{1,max}$ between 0.35% and 0.45% depending on the radius r. The core 10 is immediately surrounded by cladding 50 that includes a single cladding region 50, which extends from the core radius $r_1$ out to a cladding outer radius $r_4$ (e.g., 40 μm, 62.5 μm, 75 μm, 100 μm, etc.), and having a relative refractive index $\Delta_4$, wherein $\Delta_4 < \Delta_1$. Within the cladding 50, a change of the relative refractive index $\Delta_4$

TABLE 1

Standard MM and SM fiber properties

| | | | OFL BW | | EMB BW | | Link Distance (m) | | | | | |
|---|---|---|---|---|---|---|---|---|---|---|---|---|
| Fiber | NA | $r_1$ | 850 nm | 1310 nm | 850 nm | 953 nm | 1 G | 10 G | 40 G | 100 G | 40 G* | 100 G* |
| OM1 | 0.28 | 62.5 | 200 | 500 | N/A | N/A | 275 | 33 | N/A | N/A | N/A | N/A |
| OM2 | 0.2 | 50 | 500 | 500 | N/A | N/A | 550 | 82 | N/A | N/A | N/A | N/A |
| OM3 | 0.2 | 50 | 1500 | 500 | 2000 | N/A | N/A | 300 | 100 | 100 | 240 | 75 |
| OM4 | 0.2 | 50 | 3500 | 500 | 4700 | N/A | N/A | 550 | 150 | 150 | 350 | 100 |
| OM5 | 0.2 | 50 | 3500 | 500 | 4700 | 2470 | N/A | 550 | 150 | 150 | 440 | 150 |
| SMF | 0.12 | 9 | N/A | N/A | N/A | N/A | d | d | d | d | N/A | N/A |

Table 1 shows that the link distance for standard MM fibers is between 33 meters to 550 meters depending on the data rate, in some embodiments. This is too short to cover hyperscale data centers that have link distances up to a couple of kilometers. On the other hand, the standard SM fiber can provide longer link distances, e.g., between 2 km and 10 km. This is why standard SM fiber is used for hyperscale data centers. While the standard SM fiber is typically few-moded at the shorter wavelengths of interest (e.g., 800 nm to 1100 nm), the OFL modal bandwidth in this wavelength range is too small to be of practical use for short-distance data links currently provided with MM VCSELS and standard MM fiber in this wavelength range. This is a problem because data centers have many short-distance links, e.g., less than a few hundred meters.

Single-Core Optical Fiber for Use with SM and FM VCSELs

FIG. 1 is a schematic elevated view of a section of an example single-core (SC) optical fiber 6S configured to be used effectively with SM and FM VCSELs, according to some embodiments.

respective with the radius r is substantially zero, such as between −0.05% and 0.05% or between −0.02% and 0.02%.

In some embodiments, different from the physical configuration of SC fiber 6S having a graded-index core as shown in FIG. 2, a set of fibers can have a one-step and two-step refractive index core. Such disclosed fibers can meet the requirements of cutoff and mode field diameter of standard SM fiber while having a high bandwidth for SM transmission in a wavelength range above 1260 nm and/or FM VCSEL transmission in a wavelength range between 800 nm and 1100 nm. The disclosed fibers can be compliant and compatible with the standard cutoff wavelength and MFD of a SM fiber at 1310 nm and 1550 nm for SM operation and can be optimized for modal bandwidth at a wavelength between 800 nm and 1100 nm for few mode transmission with SM or FM VCSELs.

Figure 3:
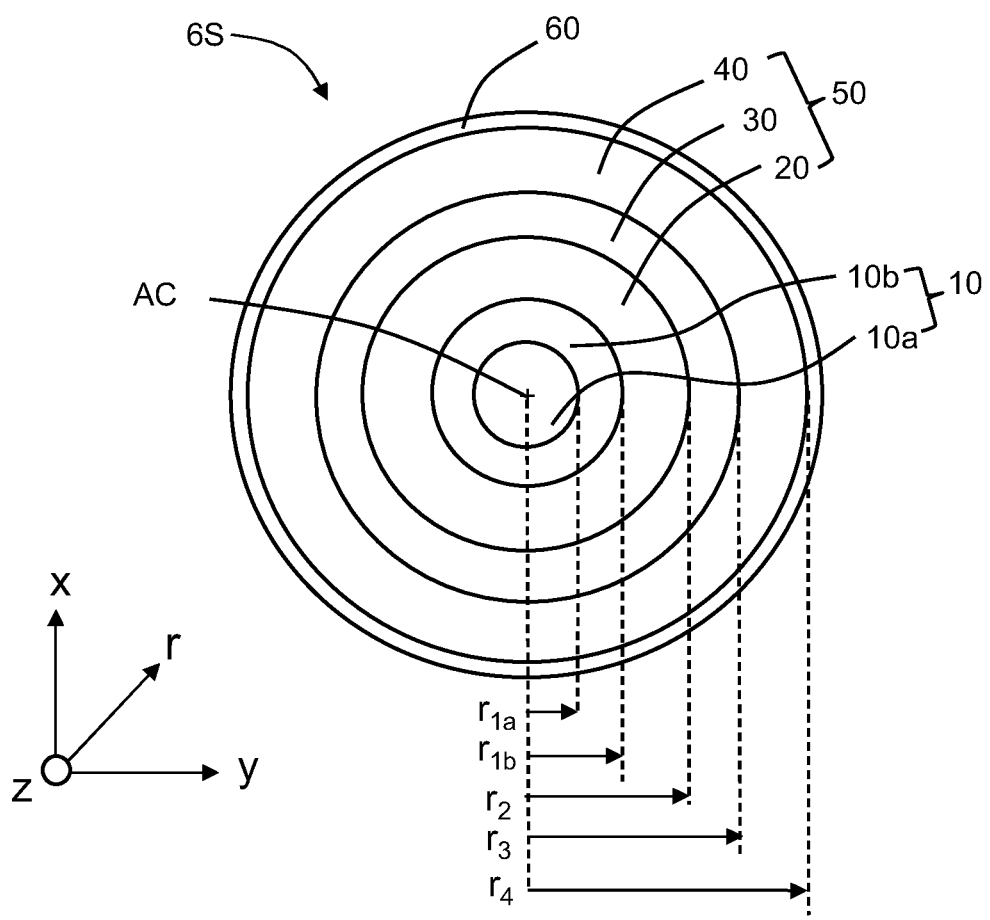
FIG. 3 is a cross-sectional view of a single-core optical fiber, according to some embodiments.

Referring to FIG. 3, a cross-sectional view of an exemplary SC fiber 6S having a two-step refractive index core in x-y plane is shown in accordance with some embodiments of the present disclosure.

As illustrated, in some embodiments, the core 10 can include two regions 10A and 10B having different refractive indexes. For example, the inner core region 10A can have a radius $r_{1a}$ and a relative refractive index $\Delta_{1a}$, and the outer core region 10B can extend from the radius $r_{1a}$ to a radius $r_{1b}$ and have a relative refractive index $\Delta_{1b}$. In some embodiments, the cladding 50 can include three regions 20, 30 and 40 having different refractive indexes. Specifically, an inner cladding region ("inner cladding") 20 can extend from the radius $r_{1b}$ to a radius $r_2$ and have a relative refractive index $\Delta_2$, an intermediate cladding region or "trench" 30 can extend from the radius $r_2$ to a radius $r_3$ and have a relative refractive index $\Delta_3$, and an outer cladding region ("outer cladding") 40 can extend from the radius $r_3$ to a radius $r_4$ and have a relative refractive index $\Delta_4$. In some embodiments, the fibers 6S can further include a protective coating 60 made of a non-glass material, such as a polymeric material.

In some embodiments, the fiber 6S can have a number of different physical configurations set forth below that provide it with desired the optical characteristics for use with FM and MM VCSELs. In some embodiments, the physical configuration of the fiber 6S defines a cable cutoff wavelength $\lambda_C$ below 1260 nm and an MFD in the range from 8.0 $\mu m \leq MFD \leq 10.1$ $\mu m$ or in the range from 8.6 $\mu m \leq MFD \leq 9.5$ $\mu m$ at a wavelength $\lambda$ of 1310 nm, or an MFD in the range from 8.6 $\mu m \leq MFD \leq 11.0$ $\mu m$ or in the range from 9.4 $\mu m \leq MFD \leq 11.0$ $\mu m$ at a wavelength $\lambda$ of 1550 nm. This can ensure that the fiber 6S is SM at a wavelength $\lambda$ above 1260 nm and is compatible with the standard SM fiber for splicing and connectorization.

In some embodiments, various fiber parameters can be properly designed to result optical fiber properties that meet SM fiber requirements for 1310 nm or 1550 nm SM transmission and bandwidth requirements for 850 nm FM transmission. For example, the radius $r_{1a}$ can be in a range between 1.8 $\mu m$ and 3.6 $\mu m$, the radius $r_{1b}$ can be in a range between 4.0 $\mu m$ and 5.6 $\mu m$, the radius $r_2$ can be in a range between 7.5 and 10.5 $\mu m$, and the radius $r_3$ can be in a range between 9.5 $\mu m$ and 14.5 $\mu m$, and the radius $r_4$ can be in a range between 40 $\mu m$ and 100 $\mu m$. The relative refractive index $\Delta_{1a}$ can be in a range between 0.30% and 0.45%, the relative refractive index $\Delta_{1b}$ can be less than $\Delta_{1a}$ and in a range between 0.28% and 0.35%, the relative refractive index $\Delta_2$ can be in a range between −0.05% and 0.05%, the relative refractive index $\Delta_3$ can be in a range between −0.5% and −0.2%, and the relative refractive index $\Delta_4$ can be in a range between 0.05% and 0.12%.

The fiber 6S can also have a zero-dispersion wavelength $\lambda_0$ within the wavelength range from 1300 nm to 1320 nm, which is the same as for a standard SM fiber. However, the dispersion requirement can be relaxed for the fiber 6S for short-link applications, e.g., <2 km. The relaxation of the dispersion requirement allows for the fiber 6S to have a higher NA and a larger core size (radius $r_1$ or radius $r_{1b}$) than that for a standard SM fiber for easy coupling to SM or FM VCSELs and for improved bending performance.

Example Physical Configurations

The fiber 6S can have several physical configurations, which are defined by way of example as a relative refractive index profile.

Figure 4A:
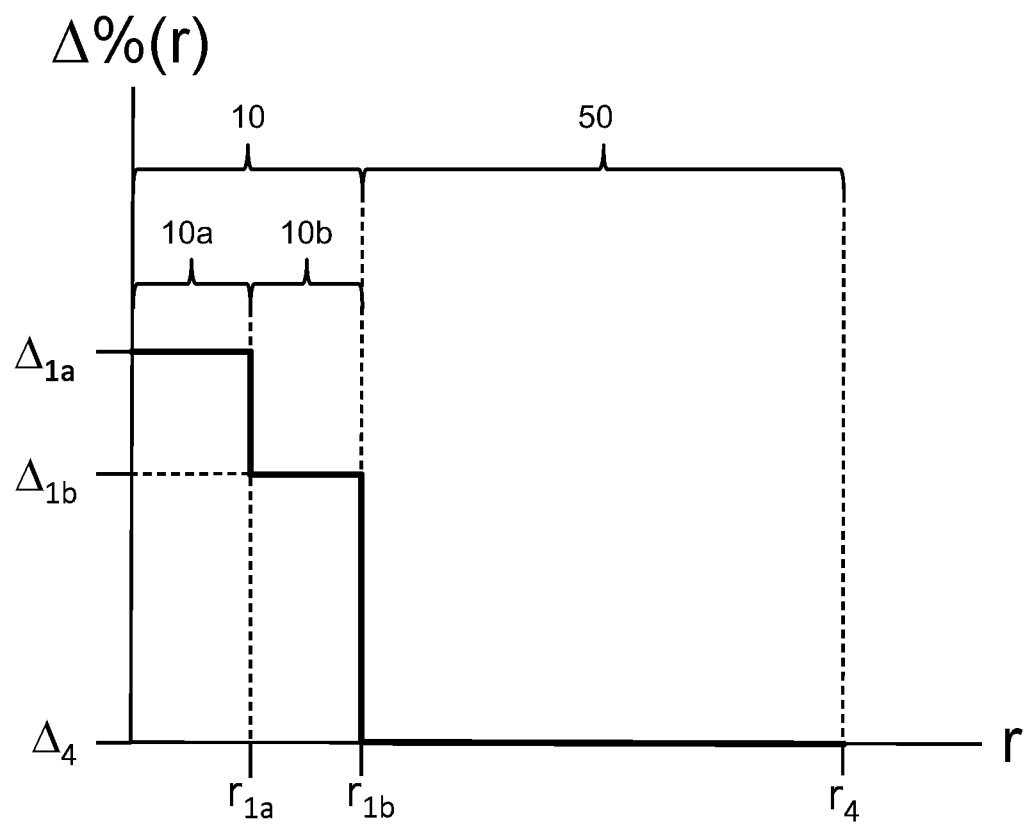
FIGS. 4A through 4E are example relative refractive index profiles of a single-core optical fiber, according to some embodiments.

FIG. 4A is a first example physical configuration of a fiber in the form of a plot of the relative refractive index $\Delta\%$ (r) versus the radial coordinate r, according to some embodiments. For example, fiber 6S is SM for wavelengths greater than $\lambda_C$=1260 nm and is configured to have a low bending loss. The SC fiber 6C can also be configured to have few modes and have a sufficiently high BW for short-distance data communication links in wavelength range between 800 nm to 1100 nm.

In some embodiments, the core 10 can include an inner core region 10a having a radius $r_{1a}$ and a relative refractive index $\Delta_{1a}$, and an outer core region 10b extending from the radius $r_{1a}$ to a radius $r_{1b}$ and having a relative refractive index $\Delta_{1b}<\Delta_{1a}$. In some embodiments, the relative refractive index $\Delta_{1a}$ can be in a range between 0.36% and 0.40%, and the relative refractive index $\Delta_{1b}$ can be in a range between 0.28% and 0.32%. The radius $r_{1a}$ can be in a range between 2.0 $\mu m$ and 2.4 $\mu m$, and the radius $r_{1b}$ can be in a range between 4.2 $\mu m$ and 4.6 $\mu m$.

In some embodiments, the core 10 is immediately surrounded by the cladding 50 that extends from the radius $r_{1b}$ out to a radius $r_4$ and having a relative refractive index $\Delta_4$ that is substantially zero, such as between −0.02% and 0.02%. In one example, the radius $r_4$ is 62.5 $\mu m$ for standard optical fiber. Other radii $r_4$ can be used, for example, 40 $\mu m$, 75 $\mu m$, and 100 $\mu m$.

Figure 4B:
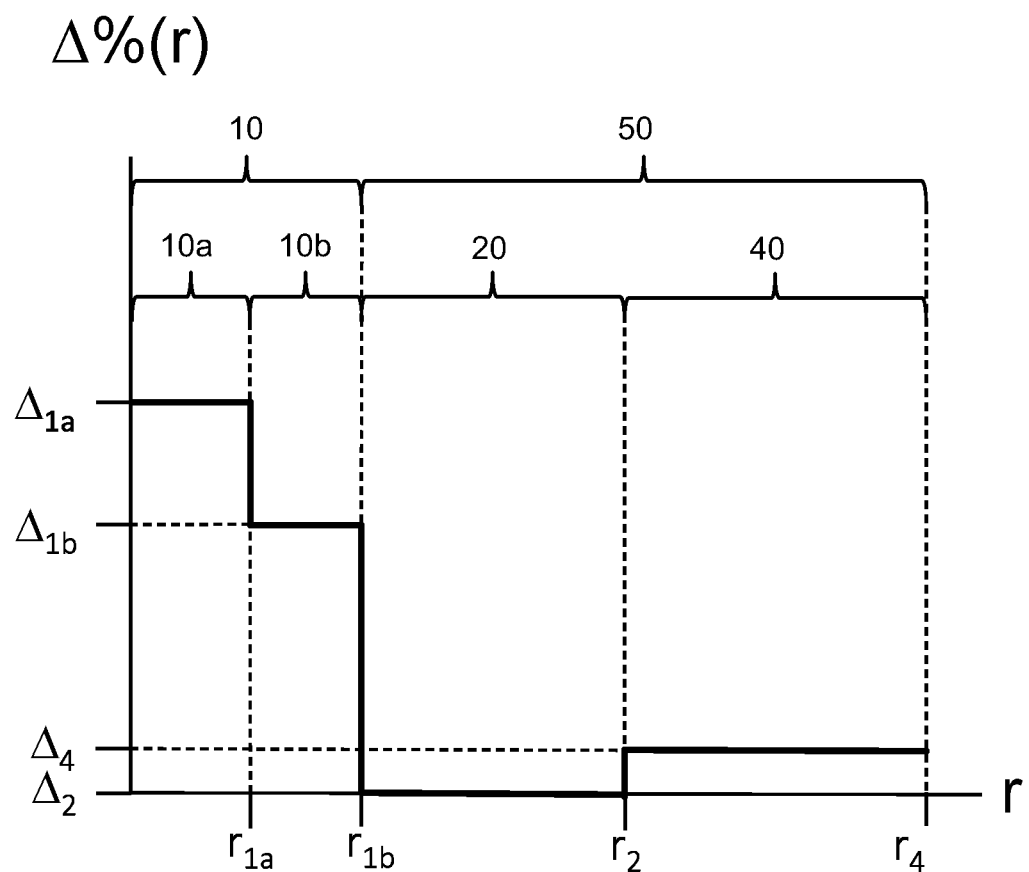

FIG. 4B is another plot of the relative refractive index $\Delta\%$ (r) versus the radial coordinate illustrating a second example physical configuration of the fiber 6S, according to some embodiments. For example, the fiber 6S is SM for wavelengths greater than $\lambda_C$=1260 nm. The fiber 6S can also be configured to have few modes and have a sufficiently high BW for short-distance data communication links at wavelength range between 800 nm to 1100 nm.

In some embodiments, the core 10 can include an inner core region 10a having a radius $r_{1a}$ and a relative refractive index $\Delta_{1a}$, and an outer core region 10b extending from the radius $r_{1a}$ to a radius $r_{1b}$ and having a relative refractive index $\Delta_{1b}<\Delta_{1a}$. In some embodiments, the relative refractive index $\Delta_{1a}$ can be in a range between 0.38% and 0.44%, and the relative refractive index $\Delta_{1b}$ can be in a range between 0.28% and 0.34%. The radius $r_{1a}$ can be in a range between 2.2 $\mu m$ and 2.8 $\mu m$, and the radius $r_{1b}$ can be in a range between 4.8 $\mu m$ and 5.4 $\mu m$.

In some embodiments, the core 10 is immediately surrounded by the cladding 50 that extends from the radius $r_{1b}$ out to a radius $r_4$. The cladding 50 can include an inner cladding region 20 extending from the radius $r_{1b}$ to a radius $r_2$ and having a relative refractive index $\Delta_2$ that is substantially zero, such as between −0.02% and 0.02%. The cladding 50 can further include an outer cladding region 40 surrounding the inner cladding region 20, extending from the radius $r_2$ to the radius $r_4$, and having a relative refractive index $\Delta_4$, wherein $\Delta_2 \leq \Delta_4 < \Delta_{1b}$. For example, the relative refractive index $\Delta_4$ can be in a range between 0.08% and 0.12%. The radius $r_2$ can be in a range between 9 $\mu m$ and 11 $\mu m$. Typically, the radius $r_4$ is 62.5 $\mu m$ for standard optical fiber. Other radii $r_4$ can be used, for example, 40 $\mu m$, 75 $\mu m$, and 100 $\mu m$.

Figure 4C:
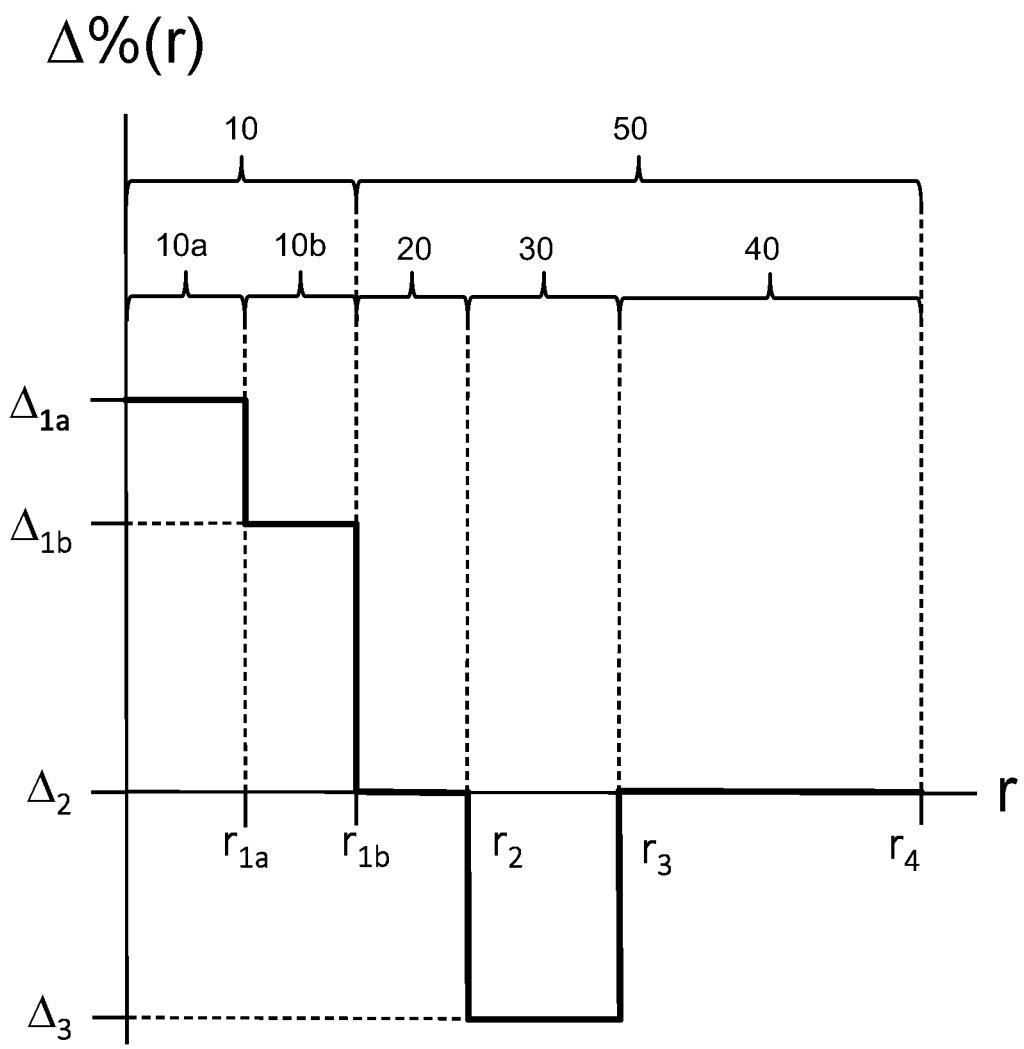

FIG. 4C is another plot of the relative refractive index $\Delta\%$ (r) versus the radial coordinate illustrating a third example physical configuration of the fiber 6S, according to some embodiments. For example, the fiber 6S is SM for wavelengths greater than $\lambda_C$=1260 nm. The fiber 6S can also be configured to have few modes and have a sufficiently high BW for short-distance data communication links at wavelength range between 800 nm to 1100 nm.

In some embodiments, the core 10 can include an inner core region 10a having a radius $r_{1a}$ and a relative refractive index $\Delta_{1a}$, and an outer core region 10b extending from the radius $r_{1a}$ to a radius $r_{1b}$ and having a relative refractive index $\Delta_{1b}<\Delta_{1a}$. In some embodiments, the relative refractive index $\Delta_{1a}$ can be in a range between 0.32% and 0.38%, and the relative refractive index $\Delta_{1b}$ can be in a range between 0.25% and 0.30%. The radius $r_{1a}$ can be in a range between 2.0 μm and 2.4 μm, and the radius $r_{1b}$ can be in a range between 4.2 μm and 4.8 μm.

In some embodiments, the core 10 is immediately surrounded by the cladding 50 that extends from the radius $r_{1b}$ out to a cladding outer radius $r_4$. The cladding 50 can include an inner cladding region 20 extending from the radius $r_{1b}$ to a radius $r_2$ and having a relative refractive index $\Delta_2$ that is substantially zero, such as between −0.02% and 0.02%. The cladding 50 can further include an intermediate cladding region 30 surrounding the inner cladding region 20, extending from the radius $r_2$ to a radius $r_3$, and having a negative relative refractive index $\Delta_3$ in a range between −0.26% and −0.34%. The cladding 50 can include an outer cladding region 40 extending from the radius $r_3$ to the radius $r_4$ and having a relative refractive index $\Delta_2$ that is substantially zero, such as between −0.02% and 0.02%. The radius $r_2$ can be in a range between 9 μm and 10 μm, and the radius $r_3$ can be in a range between 13 μm and 15 μm. Typically, the radius $r_4$ is 62.5 μm for standard optical fiber. Other radii $r_4$ can be used, for example, 40 μm, 75 μm, and 100 μm.

Figure 4D:
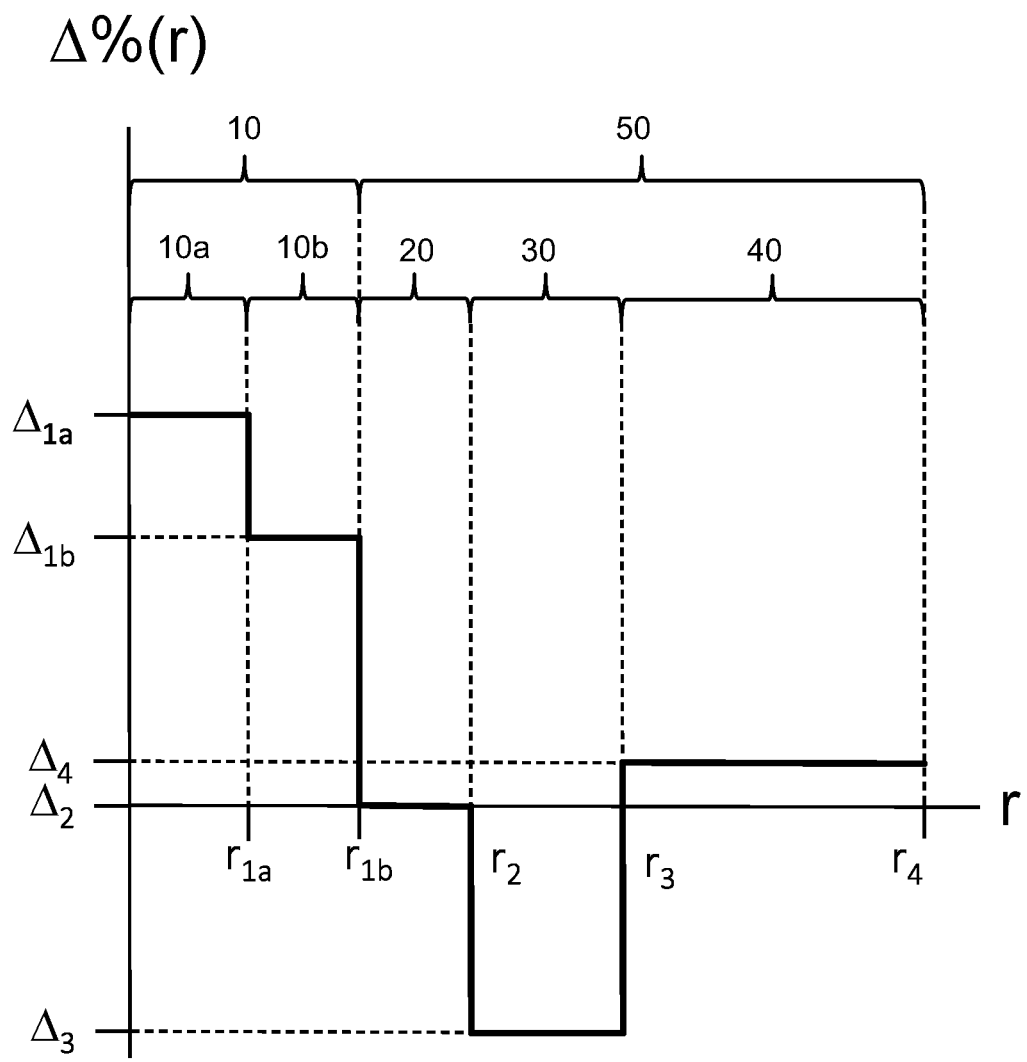

FIG. 4D is another plot of the relative refractive index $\Delta$% (r) versus the radial coordinate illustrating a fourth example physical configuration of the fiber 6S, according to some embodiments. For example, the fiber 6S is SM for wavelengths greater than $\lambda_C$=1260 nm. The fiber 6S can also be configured to have few modes and have a sufficiently high BW for short-distance data communication links at wavelength range between 800 nm to 1100 nm.

In some embodiments, the core 10 can include an inner core region 10a having a radius $r_{1a}$ and a relative refractive index $\Delta_{1a}$, and an outer core region 10b extending from the radius $r_{1a}$ to a radius $r_{1b}$ and having a relative refractive index $\Delta_{1b}<\Delta_{1a}$. In some embodiments, the relative refractive index $\Delta_{1a}$ can be in a range between 0.38% and 0.44%, and the relative refractive index $\Delta_{1b}$ can be in a range between 0.28% and 0.35%. The radius $r_{1a}$ can be in a range between 2.0 μm and 2.4 μm, and the radius $r_{1b}$ can be in a range between 4.2 μm and 4.8 μm.

In some embodiments, the core 10 is immediately surrounded by the cladding 50 that extends from the radius $r_{1b}$ out to a radius $r_4$. The cladding 50 can include an inner cladding region 20 extending from the radius $r_{1b}$ to a radius $r_2$ and having a relative refractive index $\Delta_2$ that is substantially zero, such as between −0.02% and 0.02%. The cladding 50 can further include an intermediate cladding region 30 surrounding the inner cladding region 20, extending from the radius $r_2$ to a radius $r_3$, and having a negative relative refractive index $\Delta_3$ in a range between −0.35% and −0.45%. The cladding 50 can include an outer cladding region 40 extending from the radius $r_3$ to the radius $r_4$ and having a relative refractive index $\Delta_4$, wherein $\Delta_2<\Delta_4<\Delta_{1b}$. For example, the relative refractive index $\Delta_4$ can be in a range between 0.05% and 0.12%. The radius $r_2$ can be in a range between 9 μm and 11 μm, and the radius $r_3$ can be in a range between 13 μm and 15 μm. Typically, the radius $r_4$ is 62.5 μm for standard optical fiber. Other radii $r_4$ can be used, for example, 40 μm, 75 μm, and 100 μm.

Figure 4E:
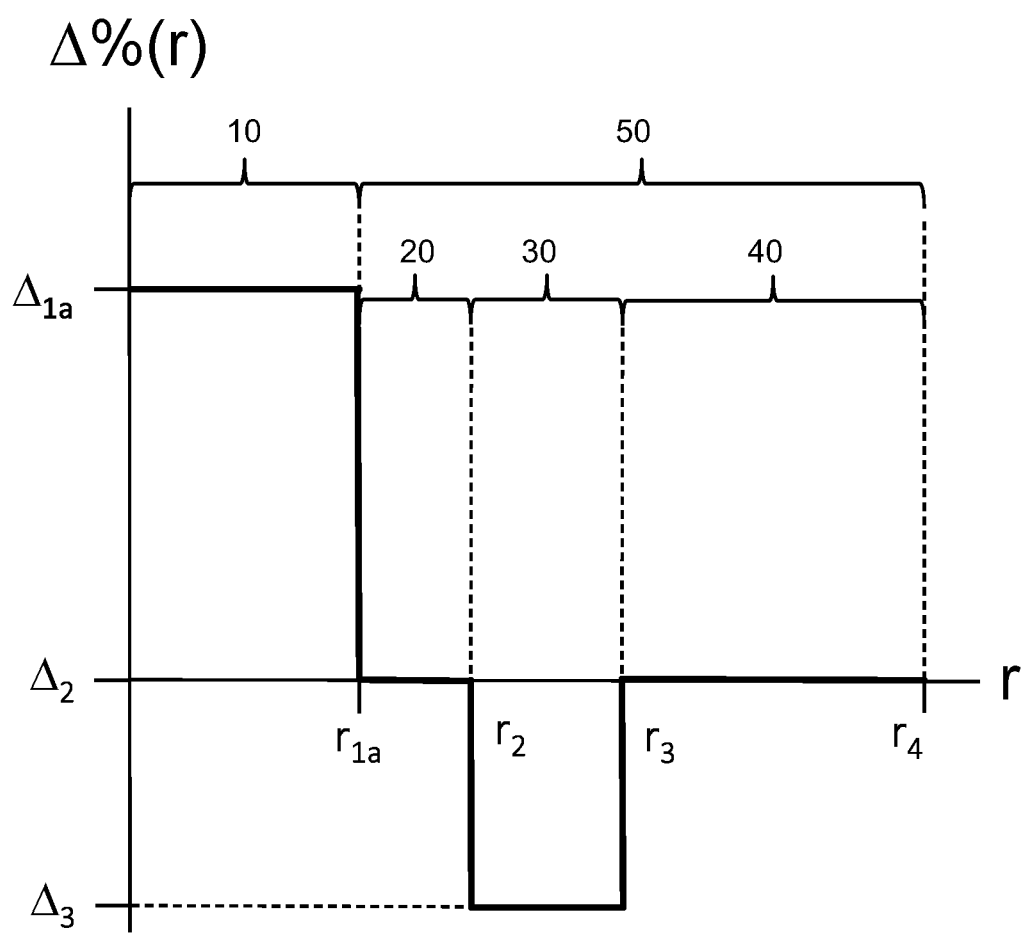

FIG. 4E is another plot of the relative refractive index $\Delta$% (r) versus the radial coordinate illustrating a fifth example physical configuration of the fiber 6S, according to some embodiments. For example, the fiber 6S is SM for wavelengths greater than $\lambda_C$=1260 nm. The fiber 6S can also be configured to have few modes and have a sufficiently high BW for short-distance data communication links at wavelength range between 800 nm to 1100 nm.

In some embodiments, the core 10 can be a single step core region having a radius $r_{1a}$ in a range between 3.2 μm and 3.6 μm and a relative refractive index $\Delta_{1a}$ in a range between 0.30% and 0.34%.

In some embodiments, the core 10 is immediately surrounded by the cladding 50 that extends from the radius $r_{1a}$ out to a radius $r_4$. The cladding 50 can include an inner cladding region 20 extending from the radius $r_{1a}$ to a radius $r_2$ and having a relative refractive index $\Delta_2$ that is substantially zero, such as between −0.02% and 0.02%. The cladding 50 can further include an intermediate cladding region 30 surrounding the inner cladding region 20, extending from the radius $r_2$ to a radius $r_3$, and having a negative relative refractive index $\Delta_3$ in a range between −0.35% and −0.45%. The cladding 50 can include an outer cladding region 40 extending from the radius $r_3$ to the radius $r_4$ and having a relative refractive index $\Delta_2$ that is substantially zero, such as between −0.02% and 0.02%. The radius $r_2$ can be in a range between 8 and 9 μm, and the radius $r_3$ can be in a range between 12 μm and 14 μm. Typically, the radius $r_4$ is 62.5 μm for standard optical fiber. Other radii $r_4$ can be used, for example, 40 μm, 75 μm, and 100 μm.

In some embodiments, proper combination of the fiber parameters in the ranges described above can result in optical fiber properties that meet standard SM fiber requirements for 1310 nm or 1550 nm SM transmission and high bandwidth requirements for 850 nm few mode transmission. In addition, the NA of the exemplary optical fibers can be greater than 0.11, which are suitable for coupling SM VCSELs to the disclosed optical fibers.

In some embodiments, by choosing proper profile parameters, the disclosed optical fiber can be designed with a cable cutoff wavelength below 1260 nm, and MFD around 9.3 μm, which ensures that the disclosed optical fiber is single mode at wavelength above 1260 nm and compatible with the standard single mode fiber for splicing and connectorization.

In some embodiments, the disclosed optical fiber can be designed with a zero-dispersion wavelength within 1300 to 1320 nm, which is the same as the standard single mode fiber. However, in some other embodiments, the dispersion requirement can be relaxed for applications in data centers because the link distance is typically below 2 km. The relaxation of dispersion allows designing fiber with higher NA and larger core size for easy coupling to SM or FM VCSELs and bending performance.

DESIGN EXAMPLES

Ten design modeled examples EX 1 through EX 10 of the fiber 6S are set forth in Tables 2 below.

Example EX 1 has a refractive index profile according to FIG. 4A, which has a two-step core 10 and a single step cladding 50.

Examples EX 2 and EX 6 have a refractive index profile according FIG. 4B, which has a two-step core 10, and a two-step cladding 50 comprising an inner cladding 20 and an outer cladding 40. In these examples, the inner cladding 20 can be pure silica with a relative refractive index substantially equal to zero. The outer cladding 40 can be up-doped relative to the inner cladding 20.

Example EX 7 has a refractive index profile according FIG. 4C, which has a two-step core 10, and a three-step cladding 50 comprising an inner cladding 20, a trench 30 and an outer cladding 40. In this example, the trench 30 can be down-doped with a negative relative refractive index, while the inner cladding 20 and the outer cladding 40 can be pure silica with a relative refractive index substantially equal to zero.

Examples EX 8 and EX 9 have a refractive index profile according FIG. 4D, which has a two-step core 10 and a three-step cladding 50 comprising an inner cladding 20, a trench 30 and an outer cladding 40. In these examples, the inner cladding 20 can be pure silica with a relative refractive index substantially equal to zero, the trench can be down-doped with a negative relative refractive index, and the outer cladding can be up-doped relative to the inner cladding 20.

Example EX 10 has a refractive index profile according FIG. 4E, which has a one-step core 10, and a three-step cladding 50 comprising an inner cladding 20, a trench 30 and an outer cladding 40. In this example, the trench 30 can be down-doped with a negative relative refractive index, while the inner cladding 20 and the outer cladding 40 can be pure silica with a relative index substantially equal to zero.

fiber at 850 nm is above 1 GHz·km and can reach even higher modal bandwidth, e.g., above 2 GHz·km, above 3 GHz·km, above 4 GHz·km, or even above 10 GHz·km. Even with anticipated profile imperfections associated with manufactured fibers 6S using the fiber draw process described below, the bandwidth is greater than 1 GHz·km. In an example, the bandwidth is greater than 2 GHz·km. In another example, the bandwidth is greater than 4 GHz·km. Compared to the one segment core design, the two-segment core design is more robust in getting more optimal MFD and cutoff wavelength.

Example Multicore Fibers

Some embodiments are directed to multicore fibers based on the use of the two-step cores 10 disclosed herein that are SM at wavelengths around 1310 nm and around 1550 nm or above 1260 nm, but that are also few mode at wavelength around 850 nm, or from 800 nm to 1100 nm and at the at least one wavelength have a modal bandwidth above 500

TABLE 2

EX 1 through EX 10

| Parameter | EX 1 | EX 2 | EX 3 | EX 4 | EX 5 | EX 6 | EX 7 | EX 8 | EX 9 | EX 10 |
|---|---|---|---|---|---|---|---|---|---|---|
| $\Delta_{1a}$ (%) | 0.38 | 0.4 | 0.42 | 0.405 | 0.43 | 0.409 | 0.35 | 0.41 | 0.41 | 0.32 |
| $r_{1a}$ (μm) | 2.2 | 2.4 | 2.6 | 2.4 | 2.6 | 2.4 | 2.2 | 2.2 | 2.2 | 3.405 |
| $\Delta_{1b}$ (%) | 0.297 | 0.306 | 0.32 | 0.306 | 0.32 | 0.306 | 0.274 | 0.314 | 0.314 | N/A |
| $r_{1b}$ (μm) | 4.4 | 5 | 5.2 | 5 | 5.2 | 5 | 4.5 | 4.6 | 4.6 | N/A |
| $\Delta_2$ (%) | N/A | 0 | 0 | 0 | 0 | 0 | 0 | 0 | 0 | 0 |
| $r_2$ (μm) | N/A | 10 | 10 | 10 | 10 | 10 | 9.5 | 10 | 10 | 8.4 |
| $\Delta_3$ (%) | N/A | N/A | N/A | N/A | N/A | N/A | −0.3 | −0.4 | −0.4 | −0.4 |
| $r_3$ (μm) | N/A | N/A | N/A | N/A | N/A | N/A | 14 | 14 | 14 | 12.9 |
| $\Delta_4$ (%) | 0 | 0.1 | 0.1 | 0.1 | 0.1 | 0.1 | 0 | 0.1 | 0.07 | 0 |
| $r_4$ (μm) | 62.5 | 62.5 | 62.5 | 62.5 | 62.5 | 62.5 | 62.5 | 62.5 | 62.5 | 62.5 |
| Cable Cutoff Wavelength $\lambda_C$ (nm) | 1146 | 1095 | 1192 | 1111 | 1210 | 1113 | 1239 | 1167 | 1240 | 830 |
| MFD at 1310 nm (μm) | 9.02 | 9.33 | 9.31 | 9.29 | 9.22 | 9.26 | 9.24 | 8.9 | 8.9 | 8.64 |
| Effective area at 1310 nm (μm$^2$) | 62.66 | 67.91 | 67.97 | 67.2 | 66.52 | 66.63 | 66.15 | 61.69 | 61.69 | 57.28 |
| Dispersion at 1310 nm (ps/nm/km) | −0.46 | 0.548 | 1.073 | 0.493 | 0.952 | 0.448 | 0.86 | 0.75 | 0.75 | −1.06 |
| Dispersion slope at 1310 nm (ps/nm$^2$/km) | 0.0869 | 0.0872 | 0.0888 | 0.0874 | 0.0891 | 0.0875 | 0.0920 | 0.0911 | 0.0911 | 0.0928 |
| MFD at 1550 nm (μm) | 10.29 | 10.56 | 10.42 | 10.51 | 10.33 | 10.47 | 10.31 | 9.94 | 9.94 | 9.81 |
| Effective area at 1550 nm (μm$^2$) | 79.92 | 85.09 | 83.52 | 84.24 | 81.89 | 83.58 | 81.49 | 75.74 | 75.74 | 72.97 |
| Dispersion at 1550 nm (ps/nm/km) | 16.36 | 16.97 | 17.96 | 16.96 | 17.91 | 16.94 | 19.13 | 18.72 | 18.73 | 17.53 |
| Dispersion slope at 1550 nm (ps/nm$^2$/km) | 0.0582 | 0.0543 | 0.0567 | 0.0545 | 0.057 | 0.0546 | 0.0648 | 0.0634 | 0.0635 | 0.0662 |
| Zero Dispersion Wavelength $\lambda_0$ (nm) | 1315 | 1304 | 1295 | 1304 | 1300 | 1305 | 1303 | 1302 | 1302 | 1321 |
| 850 nm Overfill launch bandwidth (GHz · km) | 3.89 | 1.84 | 1.12 | 4.69 | 3.33 | 19.11 | 4.43 | 2.62 | 2.62 | 2.11 |
| Comment | FIG. 4A | FIG. 4B | FIG. 4B | FIG. 4B | FIG. 4B | FIG. 4B | FIG. 4C | FIG. 4D | FIG. 4D | FIG. 4E |

All the example fibers 6S set forth in Table 2 are compliant/compatible with standard SM fiber performance with respect to the mode field diameter MFD and the cable cutoff wavelength $\lambda_C$. The examples EX 1, EX 2, EX 4, and Ex 6 through EX 9 are also compliant/compatible with the chromatic dispersion requirements of a standard SM fiber. The examples EX 3, EX 5 and EX 10 have slightly higher dispersion than a conventional SM fiber, but it the amount of dispersion is small enough for short distance data links of the type used in data center applications.

The examples EX 1 through EX 10 of the fiber 6S are specifically designed to have optimal performance at a wavelength λ of 850 nm. Specifically, the optimal alpha values are identified for each of the examples EX 1 through EX 10 so that the overfill launch bandwidth OFL BW of the MHz·km or above 1 GHz·km or above 2 GHz·km or even 5 GHz·km, which as noted above is optimized or suitable for SM or FM VCSEL transmission.

Figure 5:
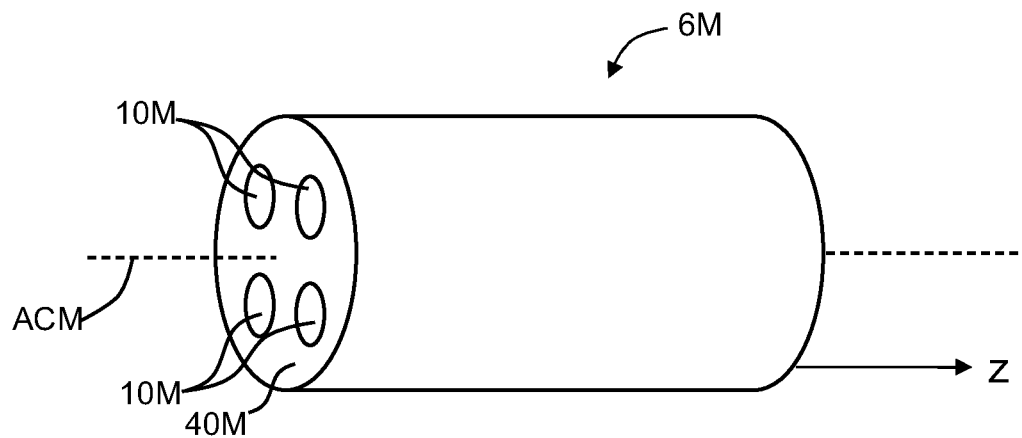
FIG. 5 is a side elevated view of a section of an example multicore optical fiber, according to some embodiments.

FIG. 5 is similar to FIG. 1 and is a side elevated view of a section of an example multicore fiber 6M, according to some embodiments. FIGS. 6A through 6D are cross-sectional views of example configurations for a multicore fiber 6M of FIG. 5. The multicore fiber 6M generally comprises a central axis ACM and two or more core structures 10M embedded in an outer cladding matrix 40M, which in an example can be the same material as the outer cladding 40 of the single core fiber 6S disclosed above. Each core structure 10M includes at least the core 10, the inner cladding region 20 and the intermediate cladding or trench region 30 as described above in connection with the single core fiber 6S. The outer cladding matrix 40M serves as a common outer cladding for each of the core structures 10M. The multicore fiber 6M is essentially a collection of single core fibers 6S that have a common outer cladding 40. The multicore fibers 6M disclosed herein can also include the non-glass protective coating 60 on the outside of the cladding matrix 40M (see FIG. 7B, introduced and discussed below).

Each core structure 10M supports a SM at a wavelength λ in the range from about 1310 nm to 1550 nm or above 1260 nm. The core structure 10M supports a few (i.e., two or three) modes at a wavelength λ, of 850 nm.

The core structures 10M can comprise those set forth in the examples EX 1 through EX 10 listed in Table 1. In an example, the two or more core structures 10M in a given multicore fiber 6M need not be the same.

Each multicore structure 10M of the multicore fiber 6M supports a modal bandwidth value of greater than 500 MHz·km, or greater than 1000 MHz·km or even greater than 2000 MHz·km at a wavelength of 850 nm. The modal bandwidth value can be at a wavelength between 800 nm and 1100 nm.

Figure 6A:
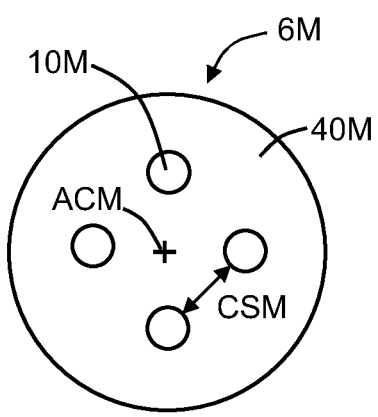
FIGS. 6A through 6D are cross-sectional views of example configurations of a multicore optical fiber, according to some embodiments.
Figure 6B:
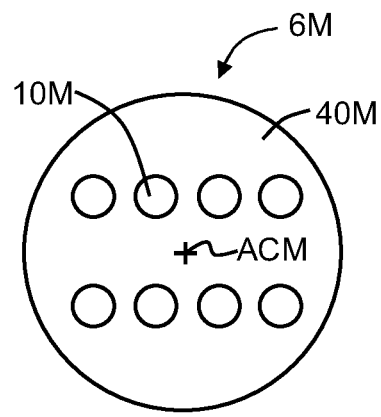
Figure 6C:
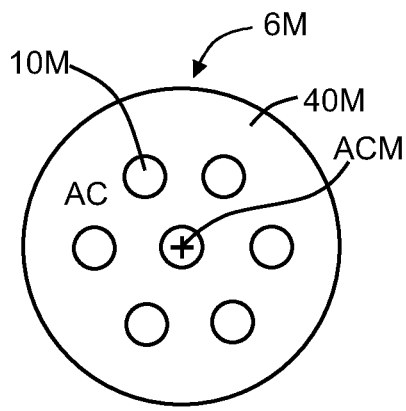
Figure 6D:
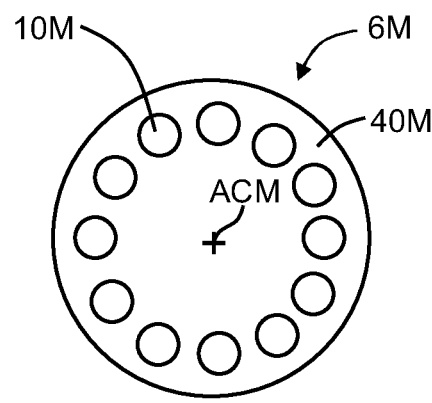

The example multicore fiber 6M of FIG. 6A has four core structures 10M in a square arrangement about the central axis ACM. The multicore fiber 6M of FIG. 6B has eight core structures 10M in a 2×4 linear arrangement (i.e., two rows of four core structures 10M). The multicore fiber 6M of FIG. 6C has seven core structures 10M, with six of the core structures arranged in a hexagonal configuration and the seventh core structure arranged on the central axis AM. The multicore fiber 6M of FIG. 6D has twelve core structures 10M arranged in a ring around the central axis ACM. Other configurations and numbers of the two or more core structures 10M can also be effectively employed.

In an example, the minimum core spacing CSM (see FIG. 6A) is in the range between 20 μm and 45 μm to avoid crosstalk between neighboring core structures 10M. Preferably the amount of crosstalk is less than −30 dB/km, more preferably less than −35 dB/km, and even more preferably less than −40 dB/km. The crosstalk depends on core design and distance between the two adjacent core structures 10M. Thus, for a given core structure design, the spacing CSM is chosen such that the cross-talk is at least less than −30 dB/km, more preferably less than −35 dB/km and most preferably less than −40 dB/km.

Fabricating the Optical Fibers

Figure 7A:
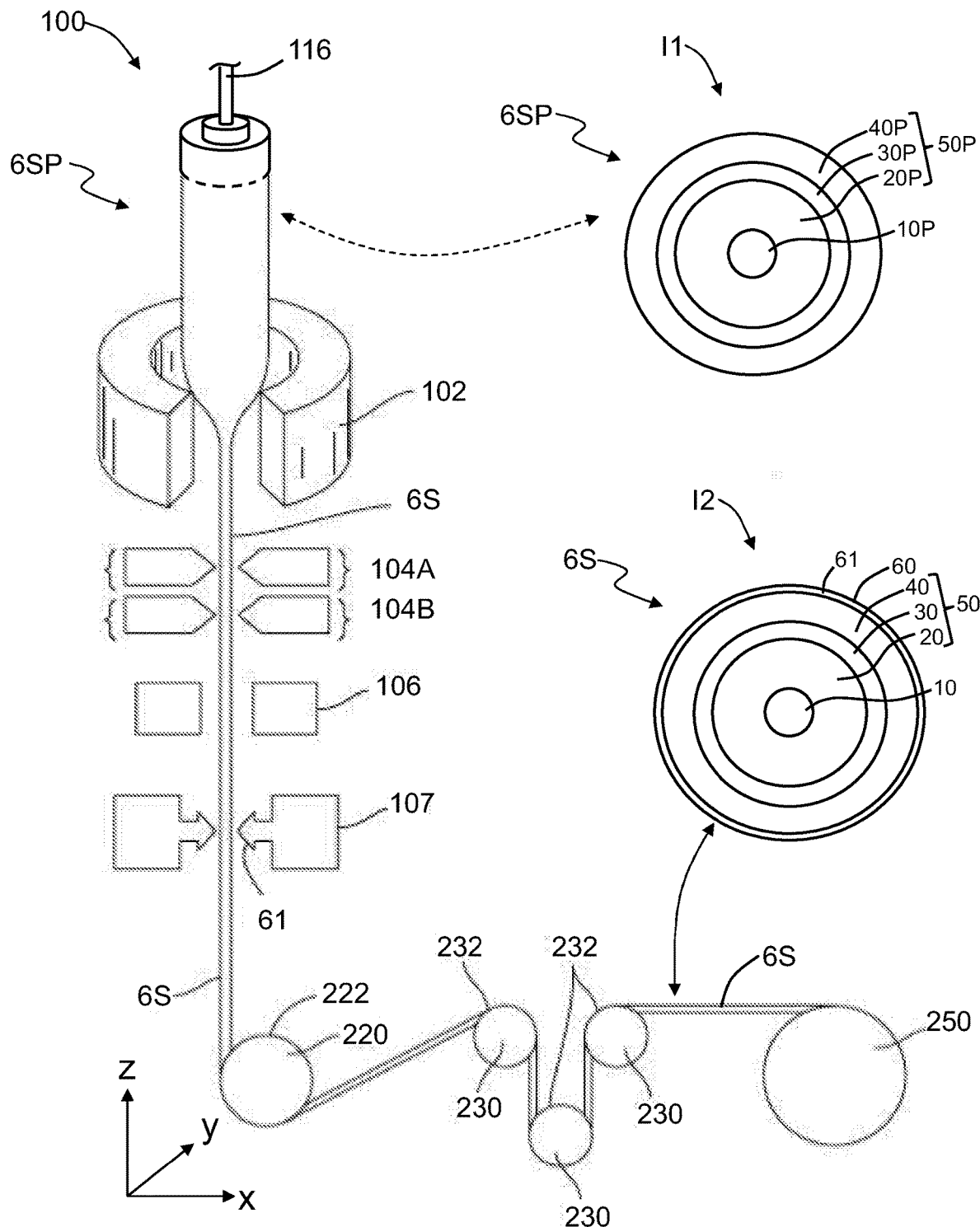
FIG. 7A is a schematic diagram of an example optical fiber drawing system illustrating fabrication of a single-core optical fiber, according to some embodiments.
Figure 7B:
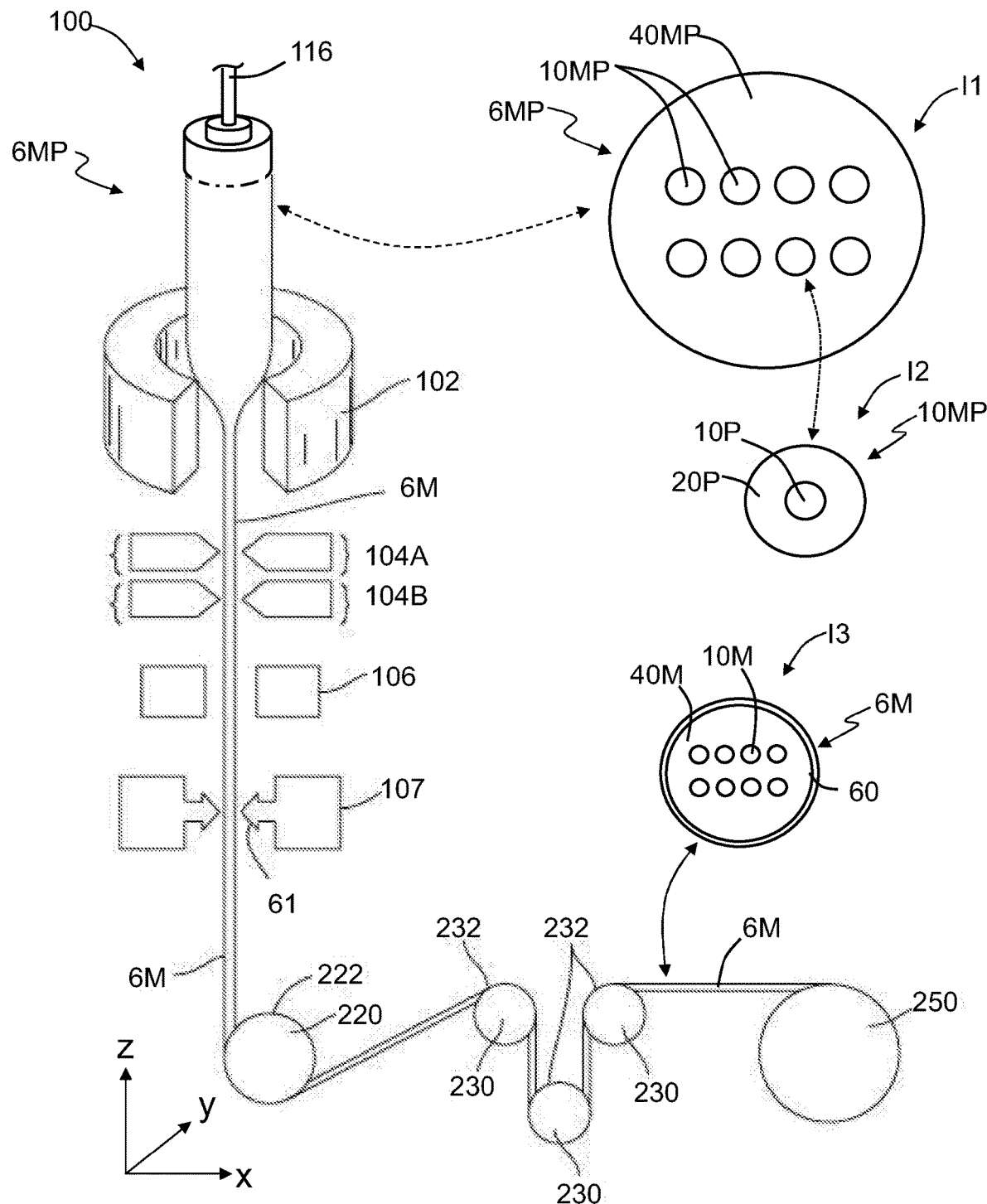
FIG. 7B is a schematic diagram of the optical fiber drawing system illustrating the fabrication of a multicore optical fiber, according to some embodiments.

FIGS. 7A and 7B are schematic diagrams of an example optical fiber drawing system ("drawing system") 100 for drawing a single-core glass preform 6SP into the single core fiber 6S (FIG. 7A) or for drawing a multicore glass preform 6MP into the multicore fiber 6M (FIG. 7B), according to some embodiments. The single core fiber 6S or the multicore fiber 6M can be fabricated using the drawing system 100 and fiber drawing techniques known in the art.

The core and cladding layers of single-core glass preform 6SP and multicore glass preform 6MP may be produced in a single-step process or multi-step process using chemical vapor deposition (CVD) methods which are well known in the art. A variety of CVD processes are known and are suitable for producing the core and cladding layers used in the optical fibers of the present invention. They include outside vapor deposition process (OVD) process, vapor axial deposition (VAD) process, modified CVD (MCVD), and plasma-enhanced CVD (PECVD). For a multicore glass preform 6MP, the cores and the common cladding can be assembled by stack and draw process or glass drilling process that are known in the art.

With reference to FIGS. 7A and 7B, the example drawing system 100 includes a draw furnace ("furnace") 102 for heating the preform 6SP or 6MP to the glass melt temperature. In an example, the fiber draw process is carried out a glass melt temperature, which in an example is in the range from 1800° C. to 1900° C. A preform holder 116 is used to hold the preform 6SP or 6MP.

In some embodiments, the drawing system 100 also includes non-contact measurement sensors 104A and 104B for measuring the size of a drawn (bare) fiber 6S or 6M that exits the draw furnace 102 for size (diameter) control. A cooling station 106 can reside downstream of the measurement sensors 104A and 104B and is configured to cool the bare single-core fiber 6S or bare multicore fiber 6M. A coating station 107 can reside downstream of the cooling station 106 and is configured to deposit a protective coating material 61 onto the bare fiber 6S or 6M to form the protective coating 60. A tensioner 220 can reside downstream of the coating station 107. The tensioner 220 can have a surface 222 that pulls (draws) the coated single-core fiber 6S or multicore fiber 6M. A set of guide wheels 230 with respective surfaces 232 resides downstream of the tensioner 220. The guide wheels 230 can serve to guide the coated single-core fiber 6S or the coated multicore fiber 6M, to a fiber take-up spool ("spool") 250 for storage.

In some embodiments, the close-up inset I1 of FIG. 7A shows a cross-sectional view of the single-core preform 6SP used to fabricate the single-core fiber 6S. The single core preform 6SP includes a preform core 10P, a preform inner cladding region 20P, a preform intermediate cladding region or preform trench 30P and a preform outer cladding 40P. In some embodiments, the preform core 10P can be either a single-step core or a two-step core. The preform inner cladding region 20P, the preform trench 30P and the preform outer cladding region 40P constitute a preform cladding 50P. The preform 6SP can be fabricated using known techniques, such as an outside vapor deposition (OVD) process.

The close-up inset I2 shows a cross-sectional view of the coated single-core fiber 6S. In an example, the protective coating material 61 comprises a non-glass material, such as a polymer or acrylate.

FIG. 7B is similar to FIG. 7A except that a multicore fiber preform 6MP is employed to form the multicore fiber 6M. The inset I1 shows a cross-sectional view of an example of the multicore fiber preform 6MP, which comprises multiple multicore preform core structures 10MP within a preform outer cladding matrix 40MP. The close-up inset I2 shows a close-up cross-sectional view of an example preform core structure 10MP having made up of a central preform core 10P and a preform inner cladding 20P, such shown in the close-up inset I1 of FIG. 6A. The close-up inset I3 shows the resulting multicore fiber 10M, which in the example shown includes the non-glass protective coating 60. The multicore fiber preform 6MP can be fabricated using techniques known in the art, such as the aforementioned OVD process or an all-glass process that utilizes a bulk cladding glass with one or more precision-formed axial holes sized to accommodate respective one or more canes that define the preform core structures.

Standard SM Fiber Bandwidth Characterization

Experiments were conducted to characterize the modal bandwidth of Corning® SMF-28® Ultra fiber. It is noted that, the procedure to do the bandwidth characterization for the disclosed two-step core SM fibers is the same of that for the modal bandwidth of Corning® SMF-28® Ultra fiber. And the system performance would be directly related to the modal bandwidth even if the fiber had a different refractive index design. Therefore, the data from Corning® SMF-28® Ultra fiber is used to illustrate the fiber modal bandwidth characterization technique and subsequently the system performance experiment.

Figure 8A:
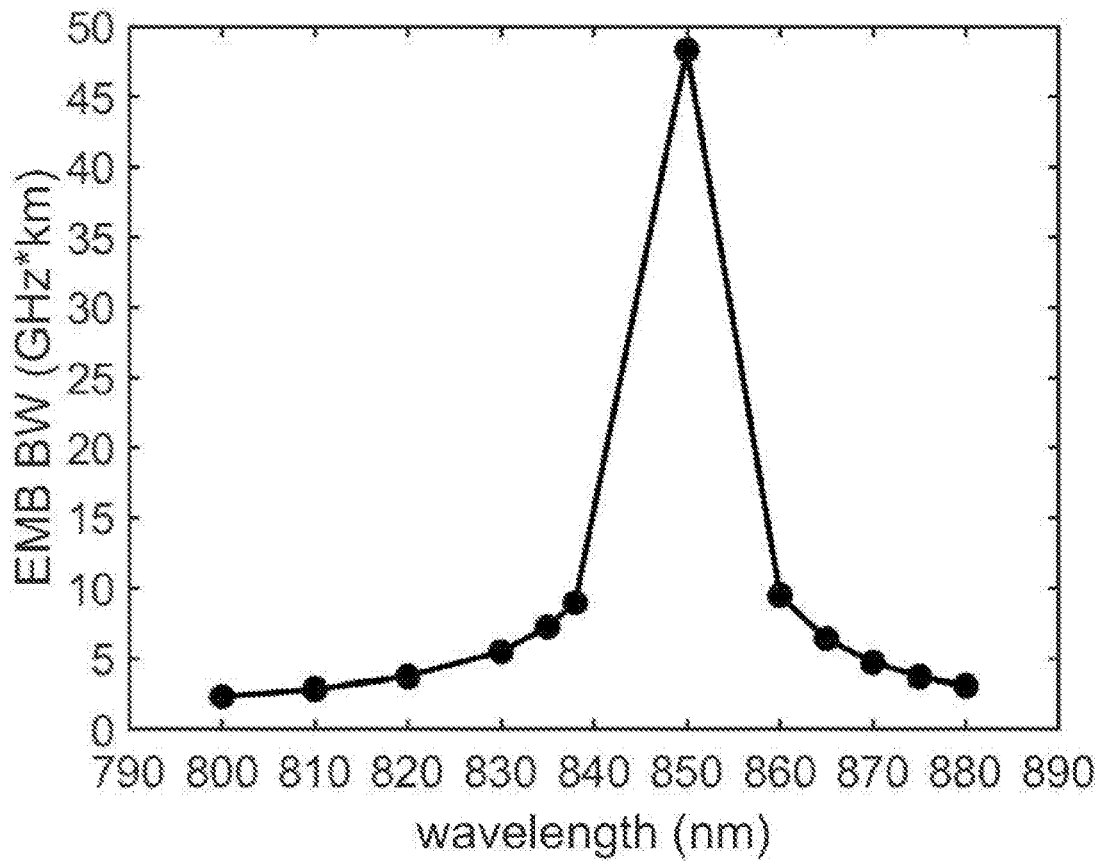
FIG. 8A is a plot of characterized effective modal bandwidth EMB BW (GHz·km) versus $\lambda$ (nm) wavelength of a standard SM fiber, according to some embodiments.

The modal bandwidth of several SMF28® Ultra fibers was measured using a frequency domain method when two modes were nearly equally excited. SMF28® Ultra fiber is a graded-index fiber having a single core segment surrounded by an inner clad, which is surrounded by an outer clad which is updoped relative to the pure silica level. In the six examples shown in Table 3 below, the core relative refractive index $\Delta_{1max}$ is about 0.4-0.44%, core radius $r_1$ is about 6.0 µm, the inner clad relative refractive index $\Delta_2$ is about zero, the radius $r_2$ is about 12.5 µm, and the outer clad is up-doped with a relative refractive index $\Delta_4$ of about 0.03%. FIG. 8A is a plot of the characterized OFL BW (GHz·km) versus λ (nm) wavelength of an example SMF-28® Ultra fiber (i.e., Fiber 1 in Table 3 below).

TABLE 3

Overfilled Launch Bandwidth

| Fiber | OFL BW (GHz · km) |
|---|---|
| Fiber 1 | 48.3 |
| Fiber 2 | 2.08 |
| Fiber 3 | 1.03 |
| Fiber 4 | 3.93 |
| Fiber 5 | 1.64 |
| Fiber 6 | 14.3 |

The measured OFL BW values range from about 1 GHz·km (Fiber 3) to 48 GHz·km (Fiber 1). Note that by comparison the OFL BW of standard OM4 fiber is 3.5 GHz·km at 840 nm. Fiber 1, Fiber 4 and Fiber 6 have an OFL BW well above the OM4 OFL BW threshold. For comparison, the measured OFL BW of a step-index SM fiber was measured to be 0.18 GHz·km, which is much lower than the graded-index profile single mode fibers in Table 3.

Figure 8B:
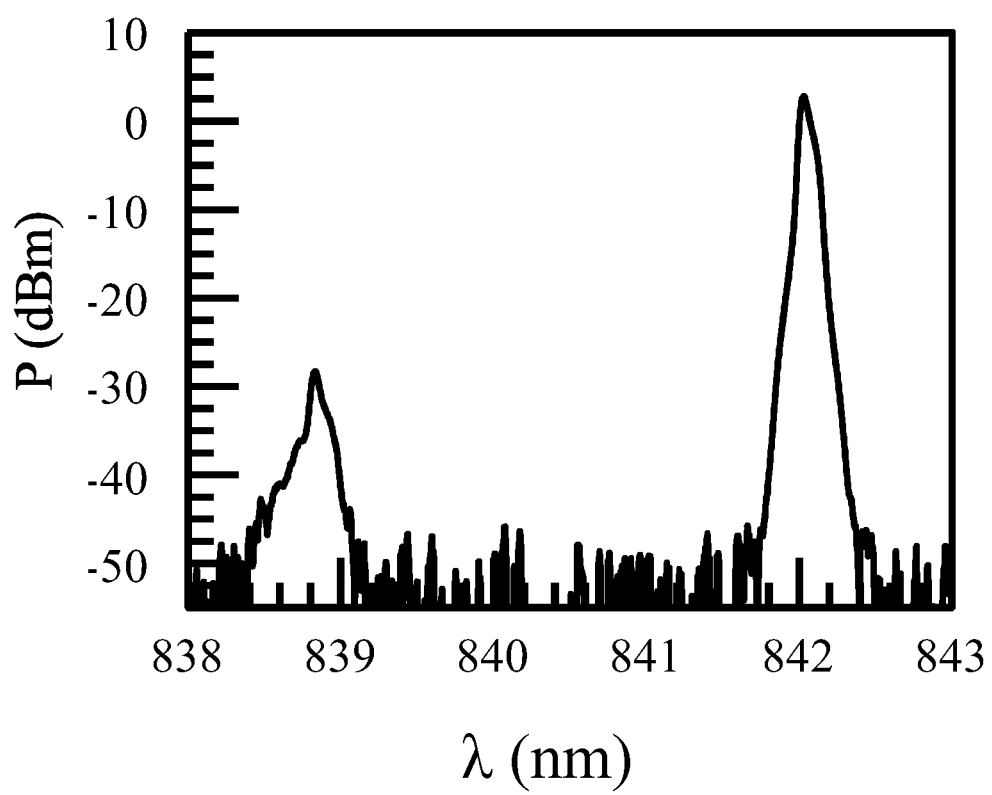
FIG. 8B is a plot of optical signal power P(dBm) versus wavelength $\lambda$ (nm) that shows an optical spectrum of a SM VCSEL after light is coupled into a fiber, according to some embodiments.

Data transmission experiments were also conducted using a SM VCSEL suitable for 25 Gb/s transmission. FIG. 8B is a plot of optical signal power P (dBm) vs wavelength λ (nm) that shows the optical spectrum of the SM VCSEL after the light is coupled into the example Fiber 1. The primary mode is located near 842 nm. The second mode is located at wavelength near 839 nm and at a power level 30 dB below, essentially non-existing. Therefore, this VCSEL is essentially single moded.

In some embodiments, at the free space wavelength λ, the SM VCSEL has a total optical power of around 0.76 mW or −1.2 dBm. After the coupling into the example Fiber 1, with 2.7 V of DC driving voltage or about 3.5 mA driving current, the optical power output from the fiber is −3.6 dBm. An Agilent BERT system operating at 25 Gb/s can be used for measuring bit error rate (BER). The controller (N4960A-CJ1) controls the pattern generator (N4951B) with 5-tap de-emphasis and error detector (N4952A-E32). The controller also provides a clock signal to the pattern generator. $2^7$-1 PRBS pattern is used across all experiments. The SM VCSEL was driven with 2.7 V DC voltage and 1.4 Vpp RF signal through a bias-T (SHF 122C).

Example Data Transmission Systems

Figure 9A:
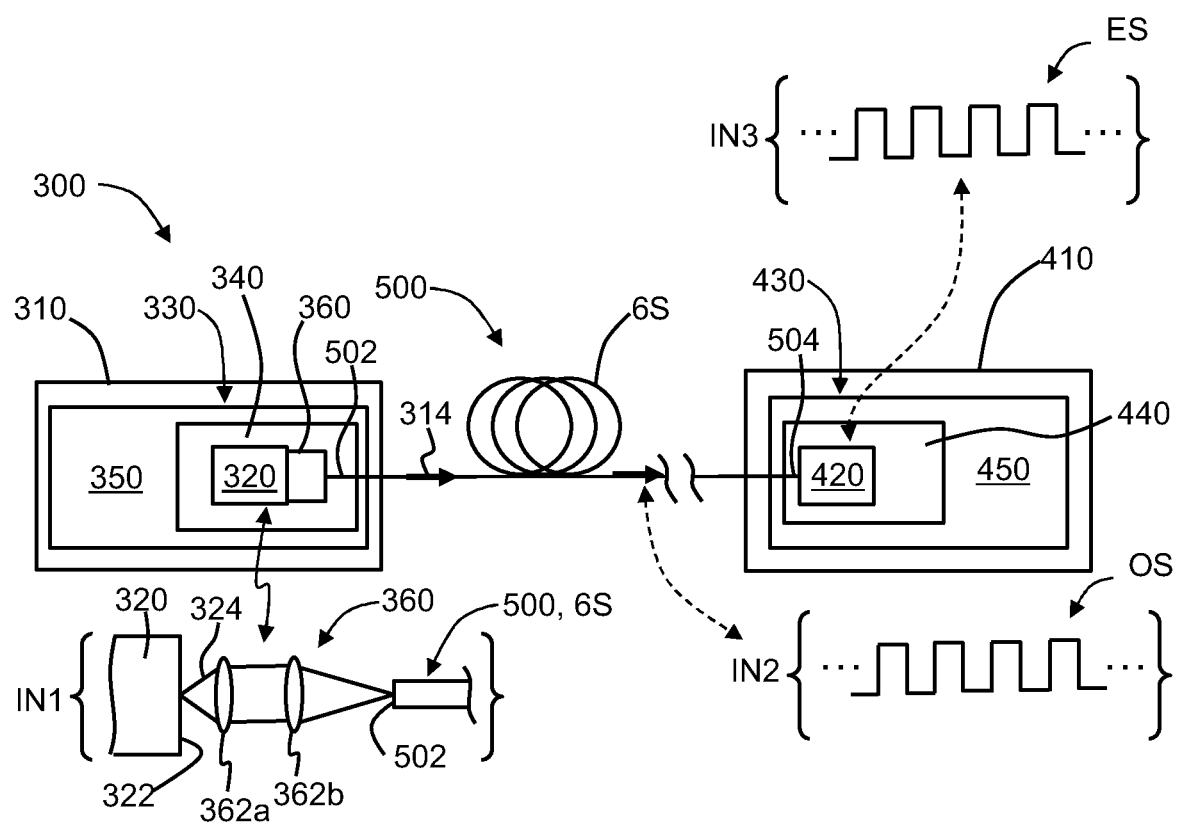
FIG. 9A is a schematic diagram of an example optical fiber data communications system that employs a single-core optical fiber to form an optical fiber link between a VCSEL-based transmitter and a receiver, according to some embodiments.

FIG. 9A is a schematic diagram of an example optical fiber data communications system ("system") 300 that comprises a transmitter 310 and a receiver 410 optically connected by an optical fiber link 500, according to some embodiments. In one example, the optical fiber link 500 comprises at least a section of the single core fiber 6S as disclosed herein. In an example, the optical fiber link 500 has an input end 502, an output end 504, and link length LL measured along the fiber(s) of the link between the input and output ends (see close-up inset IN1, which shows the optical fiber link 500 "unwound" to show the link length LL of the example systems disclosed herein). In an example, the link length is up to 1000 meters. In an example, the optical fiber link 500 can be constituted by a middle section constituted by a section of fiber 6S and input and output end sections constituted by relatively short jumper cables (e.g., a few meters long, at most). In an example, the jumper cables can also be made of the fiber 6S.

An example transmitter 310 includes a VCSEL 320 and a transmitter electronics unit 330 configured to operably support the operation of the VCSEL. In an example, the transmitter electronics unit 330 comprises a transmitter electronic integrated circuit (IC) 340 operably supported by a transmitter circuit board (e.g., a printed circuit board or PCB) 350. In an example, the transmitter electronic IC 340 is configured with a VCSEL driver and related electronic components (not shown) as known in the art.

With reference to the close-up inset IN1 of FIG. 9A, the VCSEL 320 has an output end 322 from which light 324 is emitted. In an example, the light 324 is optically coupled into the input end 502 of the optical link 500 (e.g., fiber 6S) using a coupling optical system 360. The example coupling optical system 360 comprises first and second lenses 362a and 362b, which in an example are aspherical lens elements. The close-up inset IN2 shows the light 324 comprising optical signals OS.

In some embodiments, the receiver 410 comprises a photodetector 420 optically coupled to the output end 504 of the optical fiber link 500. The photodetector 420 is operably supported by a receiver electronics unit 430 configured to operably support the photodetector. In an example, the receiver electronics unit 430 comprises a receiver IC 440 operably supported by a receiver circuit board (e.g., a printed circuit board or PCB) 450. In an example, photodetector 420 is configured to convert the optical signals OS encoded on the light 324 into electrical signals ES (see the close-up inset IN3 in FIG. 9A), and the receiver IC 440 is configured to receive and process the electrical signals.

In some embodiments, the system 300 is configured by virtue of the fiber 6S for SM optical transmission when the light 324 has a wavelength λ above 1260 nm and few mode optical transmission in the system 300 is compliant/compatible with the cutoff wavelength $\lambda_C$ and mode field diameter MFD of a standard SM fiber at 1310 nm and 1550 nm for SM operation and is optimized for bandwidth at a wavelength λ between 800 nm and 1100 nm for few mode transmission with SM or few mode VCSELs 320.

Figure 9B:
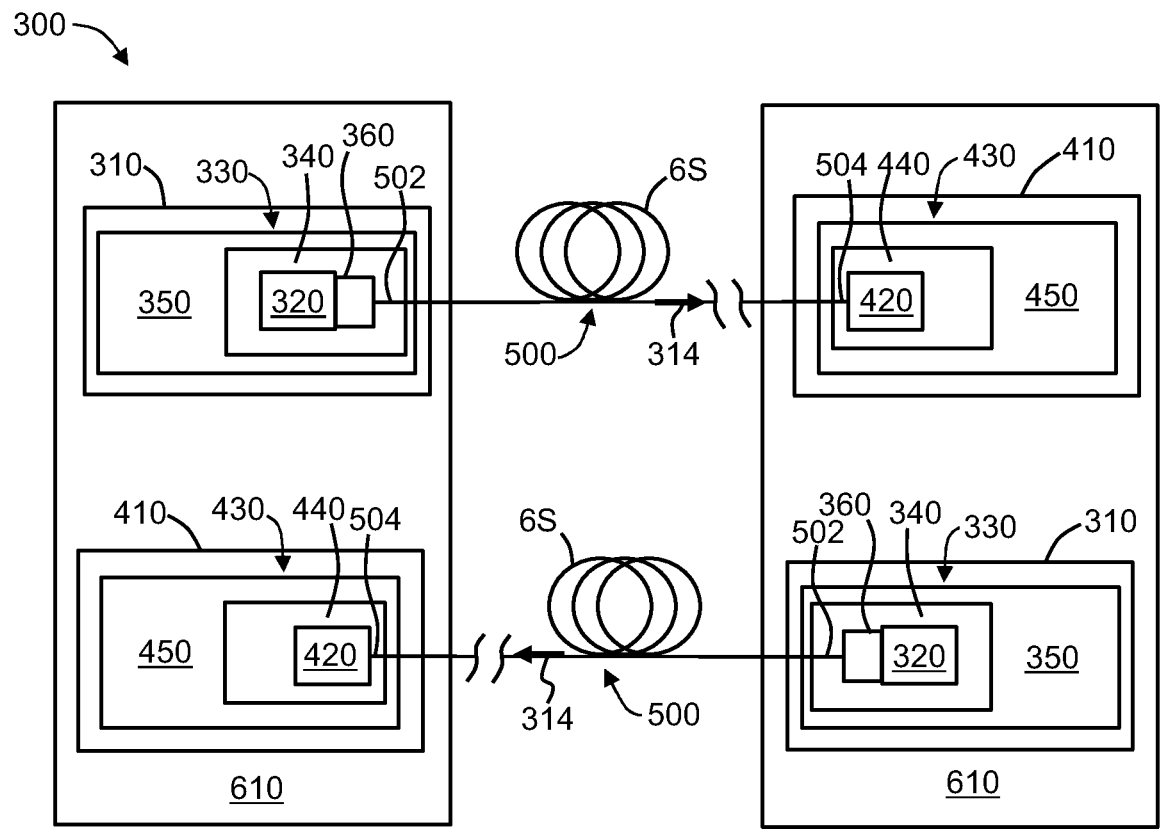
FIG. 9B is a schematic diagram of an example optical fiber data communications system having two VCSEL-based transceivers, according to some embodiments.

FIG. 9B is similar to FIG. 9A and illustrates an example system 300 that includes two transceivers 610 in optical communication via two optical fiber links 500, according to some embodiments. Each transceiver 610 can include the transmitter 310 and the receiver 410. The system 300 can provide two-way data communication between the optically coupled transceivers 610 via the two optical fiber links 500.

Figure 10A:
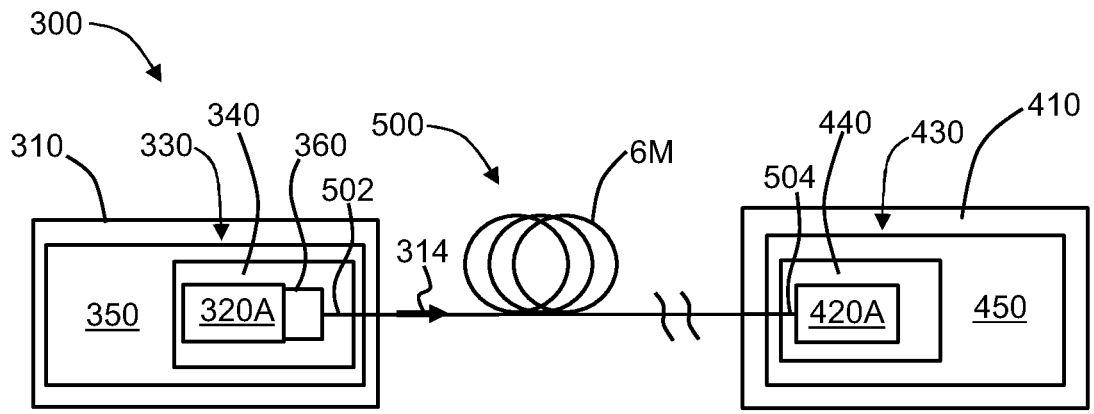
FIG. 10A is a schematic diagram of an example optical fiber data communications system that employs a multicore optical fiber to form an optical fiber link between a VCSEL-based transmitter and a receiver, according to some embodiments.
Figure 10B:
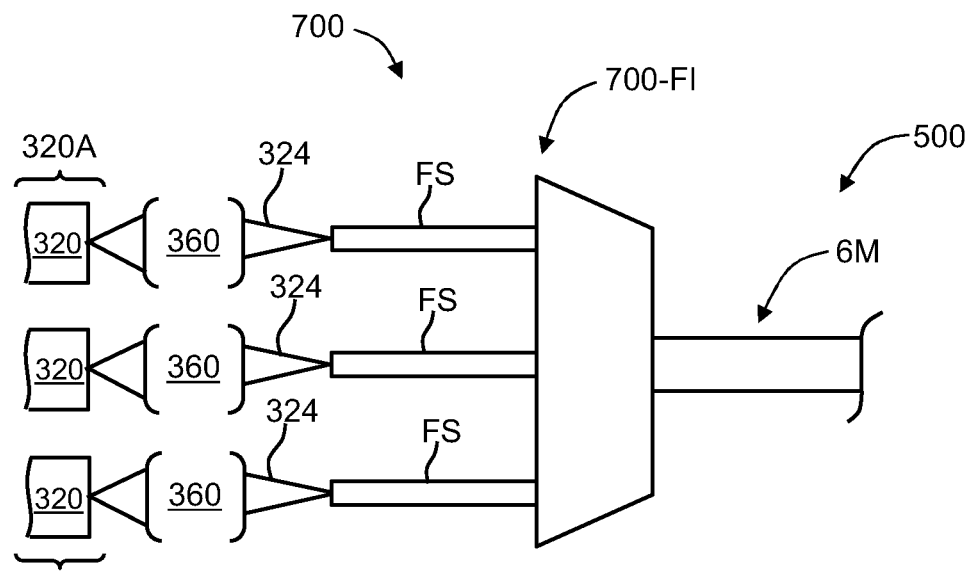
FIGS. 10B and 10C are close-up views of example optical coupling devices used to optically couple light from an array of VCSELs to a multicore optical fiber link (FIG. 10B) and to optically couple light from the multicore optical fiber link to an array of photodetectors (FIG. 10C), according to some embodiments.

FIG. 10A is similar to FIG. 9A and illustrates an embodiment of the system 300 wherein the optical fiber link 500 comprises at least a section of multicore fiber 6M as disclosed herein to define a multicore optical fiber link. The transmitter 310 now includes a VCSEL array 320A that has multiple VCSELs 320, as shown in the close-up view of FIG. 10B. In an example, the different VCSELs 320 in the VCSEL array emit light 324 having different wavelengths within a wavelength range from 800 nm and 1100 nm. In an example, the different wavelengths are spaced apart by at least several nm, and in an example at least 10 nm. In example, up to ten different wavelengths in a 100 nm range within the 800 nm to 1100 nm can be used.

In some embodiments, the VCSEL array 320A is optically coupled to the multicore fiber 6M via an optical coupling device 700, such as a fan-in module 700-FI. In an example, the fan-in module 700 includes short fiber sections FS, which in an example can comprise sections of the single-core fiber 6S. The fan-in module 700-FI can be configured to optically couple the light 324 from the VCSELs 320 into respective core structures 10M of the multicore fiber 10M of the multicore optical fiber link 500. The multicore optical fiber link 500 employing the multicore fiber 10M with n core structures 10M can carry n times more data than the optical fiber link 500 having only one single-core fiber 6S.

Figure 10C:
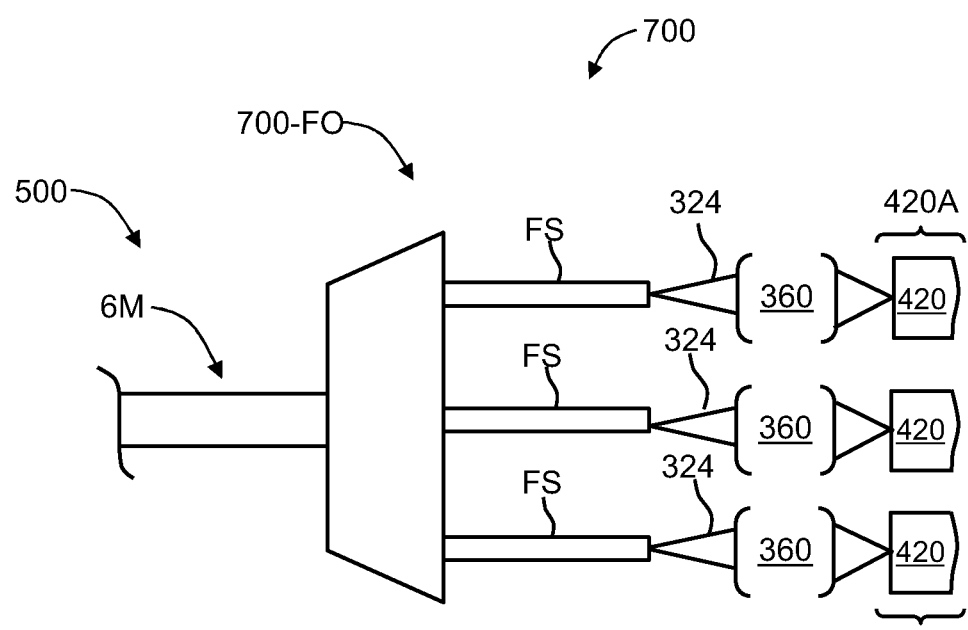

FIG. 10C shows an example fan-out module 700-FO used to optically couple the light 324 exiting the different core structures 10M of the multicore optical fiber link 500 to respective photodetectors 420 in an array of photodetectors 420A in the receiver 410.

Figure 10D:
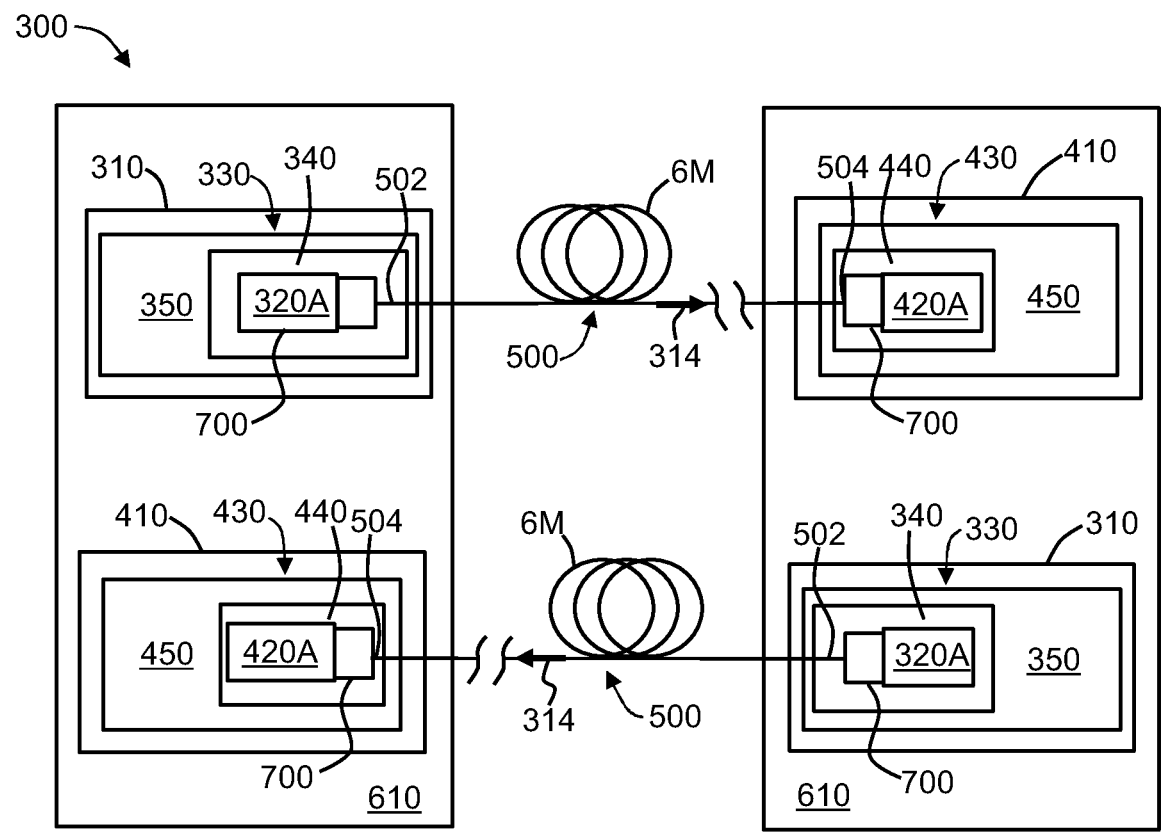
FIG. 10D is a schematic diagram of an example optical fiber data communications system having two VCSEL-based transceivers in optical communication via two multicore optical fiber links, according to some embodiments.

FIG. 10D is similar to FIG. 10A and illustrates an example of the system 300 that utilizes two transceivers 610 each having a transmitter 310 with a VCSEL array 320A and a receiver 410 with a photodetector array 420A. Optical couplers 700 can be operably disposed to place the core structures 10M of the multicore fibers 6M of the two multicore optical fiber links 500 in optical communication with the VCSEL array 320A and the photodetector array 420A.

In some embodiments, the fiber 6S has a smaller core 10 than a standard MM fiber, but a larger core than a standard SM fiber, thereby allowing the fiber 6S to be used for SM and few mode communication of data signals over short distances, e.g., less than 1000 meters. The light 324 emitted by an SM VCSEL 320 can be focused to a relatively small focus spot for optical coupling into the fiber 6S. This focusing can be accomplished by the coupling optical system 360. The multicore fiber 6M has similarly sized core structures 10M for optically coupling to an SM VCSEL 320. A few-moded VCSEL 320 can also be used effectively at the wavelength where the fiber 6S or 6M supports a few modes. In an example that reflects the current state of the art, the example optical data communication systems 300 set forth above can be implemented for 25G duplex LC (Lucent Connector) connectivity using the form factor for standard SFP-28 SM optical fiber.

The systems 300 disclosed herein can be configured using at least one of the fibers 6S and/or 6M to meet a broad range of needs and data transmission applications. In general, the optical signals OS can be modulated using an NRZ modulation format, a PAM4 modulation format or other modulation format used in the art of high-data-rate signal transmission.

For example, for 100G transmission, most of short distance transmission is based on the QSFP28 form factor with 4×25G data streams transmitted in and out. The SM/FM VCSELs 320 can be packaged in a VCSEL array 320A to enable 4×25G transmission using a 25G NRZ modulation format or a 25G four-level pulse amplitude (PAM4).

In another example, the VCSEL 320 can be driven by 50G PAM4 electrical signals from the transmitter IC 320 just like a 100G bidirectional (BiDi) transceiver to achieve 100G transmission using two wavelengths, for example 840 nm and 910 nm.

In another example, different VCSELs 320 can be implemented to operate at different wavelengths to enable short wavelength division multiplexing (SWDM) transmission in the manner of conventional 100G SWDM transceivers. The transceivers can also be implemented to adopt the 400G transceiver form factor by using one or more of the base technology, such as 50G PAM4, parallel optics, SWDM to achieve 400G data rate per transceiver. The fiber and cable structure can be maintained the same as they are used for SM transmission so that the added function from two-step core fiber has broad compatibility.

Aspect 1 of the description is:
An optical fiber, comprising:
   a core having a step index profile, comprising:
     an inner core region having a first relative refractive index and a first radius, and
     an outer core region surrounding the inner core region, having a second relative refractive index less than the first relative refractive index, and a second radius greater than the first radius; and
   a cladding surrounding the core;
   wherein the optical fiber is single mode at wavelengths greater than 1260 nm, and is few mode in a wavelength range between 800 to 1100 nm with an overfilled bandwidth greater than 1 GHz·km at at least one wavelength in the wavelength range.

Aspect 2 of the description is:
The optical fiber of Aspect 1, wherein:
   the first relative refractive index is between 0.36% and 0.40%;
   the first radius is between 2.0 μm and 2.4 μm;
   the second relative refractive index is between 0.28% and 0.32%;
   the second radius is between 4.2 μm and 4.6 μm; and
   the cladding has a third relative refractive index that is substantially zero, and a third radius between 40 μm and 100 μm.

Aspect 3 of the description is:
The optical fiber of Aspect 1, wherein:
   the first relative refractive index is between 0.38% and 0.44%;
   the first radius is between 2.2 μm and 2.8 μm;
   the second relative refractive index is between 0.28% and 0.34%;
   the second radius is between 4.8 μm and 5.4 μm; and
   the cladding comprises:
     an inner cladding region surrounding the outer core region and having a third relative refractive index that is substantially zero, and a third radius between 9 μm and 11 μm, and
     an outer cladding region surrounding the inner cladding region and having a fourth relative refractive index between 0.08% and 0.12%, and a fourth radius between 40 μm and 100 μm.

Aspect 4 of the description is:
The optical fiber of Aspect 1, wherein:
   the first relative refractive index is between 0.32% and 0.38%;
   the first radius is between 2.0 μm and 2.4 μm;
   the second relative refractive index is between 0.32% and 0.38%;
   the second radius is between 4.2 μm and 4.8 μm; and
   the cladding comprises:
     an inner cladding region surrounding the outer core region and having a third relative refractive index that is substantially zero, and a third radius between 9 μm and 10 μm, an intermediate cladding region surrounding the inner cladding region and having a fourth relative refractive index between −0.26% and −0.34%, and a fourth radius between 13 μm and 15 μm, and an outer cladding region surrounding the inner cladding region and having a fifth relative refractive index that is substantially zero, and a fifth radius between 40 μm and 100 μm.

Aspect 5 of the description is:
The optical fiber of Aspect 1, wherein:
the first relative refractive index is between 0.38% and 0.44%;
the first radius is between 2.0 μm and 2.4 μm, and
the second relative refractive index is between 0.28% and 0.35%;
the second radius is between 4.2 μm and 4.8 μm; and
the cladding comprises:
an inner cladding region surrounding the outer core region and having a third relative refractive index that is substantially zero, and a third radius between 9 μm and 11 μm,
an intermediate cladding region surrounding the inner cladding region and having a fourth relative refractive index between −0.35% and −0.45%, and a fourth radius between 13 μm and 15 μm, and
an outer cladding region surrounding the inner cladding region and having a fifth relative refractive index between 0.05% and 0.12%, and a fifth radius between 40 μm and 100 μm.

Aspect 6 of the description is:
The optical fiber of any of Aspects 1-5, wherein the overfilled bandwidth is at least 2 GHz·km at the at least one wavelength in the wavelength range.

Aspect 7 of the description is:
The optical fiber of any of Aspects 1-5, wherein the overfilled bandwidth is at least 5 GHz·km at the at least one wavelength in the wavelength range.

Aspect 8 of the description is:
The optical fiber of any of Aspects 1-5, wherein the overfilled bandwidth is at least 10 GHz·km at the at least one wavelength in the wavelength range.

Aspect 9 of the description is:
The optical fiber of any of Aspects 1-8, wherein the optical fiber has a cable cutoff wavelength $\lambda_C$ between 1160 nm and 1260 nm.

Aspect 10 of the description is:
The optical fiber of any of Aspects 1-9, wherein the optical fiber has a mode-field diameter between 8.0 μm and 10.1 μm at 1310 nm.

Aspect 11 of the description is:
An optical fiber data transmission system comprising:
an optical fiber link comprising the optical fiber of any of Aspects 1-10, wherein the optical fiber link has an input end, an output end and a link length less than 1000 meters;
a transmitter comprising a vertical-cavity surface-emitting laser that emits light having a wavelength in the wavelength range and that carries optical signals at a data rate of at least 10 Gb/s, wherein the vertical-cavity surface-emitting laser is optically coupled to the input end of the optical fiber link; and
a receiver comprising a photodetector optically coupled to the output end of the optical fiber link and configured to receive the optical signals and convert the optical signals to electrical signals.

Aspect 12 of the description is:
The optical fiber data transmission system of Aspect 11, wherein the data rate is at least 25 Gb/s and wherein the link length is less than 500 m.

Aspect 13 of the description is:
The optical fiber data transmission system of Aspect 11, wherein the data rate is at least 50 Gb/s and wherein the link length is less than 300 m.

Aspect 14 of the description is:
The optical fiber data transmission system of any of Aspects 11-13, wherein the optical signals are modulated using either a non-return-to-zero modulation format or a four-level pulse-amplitude modulation format.

Aspect 15 of the description is:
A method of transmitting optical data, comprising:
using a vertical cavity surface-emitting laser to generating optical data signals at a data rate of at least 10 Gb/s;
transmitting the optical data signals over an optical fiber link comprising an optical fiber of any of Aspects 1-9; and
receiving the optical signals at a photodetector configured to convert the optical signals into electrical signals representative of the optical signals.

Aspect 16 of the description is:
A multicore optical fiber, comprising:
a cladding matrix; and
two or more core sections embedded within the cladding matrix, wherein each core section has a step index profile, comprising:
an inner core region having a first relative refractive index, and a first radius, and
an outer core region surrounding the inner core region, having a second relative refractive index less than the first relative refractive index, and a second radius greater than the first radius;
wherein each core section is single mode at wavelengths greater than 1260 nm, and is few mode in a wavelength range between 800 to 1100 nm with an overfilled bandwidth greater than 1 GHz·km at at least one wavelength in the wavelength range.

Aspect 17 of the description is:
The multicore optical fiber of Aspect 16, wherein:
the first relative refractive index is between 0.36% and 0.40%;
the first radius is between 2.0 μm and 2.4 μm;
the second relative refractive index is between 0.28% and 0.32%;
the second radius is between 4.2 μm and 4.6 μm; and
the cladding matrix has a third relative refractive index that is substantially zero.

Aspect 18 of the description is:
The multicore optical fiber of Aspect 16, wherein:
the first relative refractive index is between 0.38% and 0.44%;
the first radius is between 2.2 μm and 2.8 μm;
the second relative refractive index is between 0.28% and 0.34%;
the second radius is between 4.8 μm and 5.4 μm;
each core section further comprises:
an inner cladding region surrounding the outer core region and having a third relative refractive index that is substantially zero, and a third radius between 9 μm and 11 μm; and
the cladding matrix having a fourth relative refractive index between 0.08% and 0.12%.

Aspect 19 of the description is:
The multicore optical fiber of Aspect 16, wherein:
the first relative refractive index is between 0.32% and 0.38%;

the first radius is between 2.0 µm and 2.4 µm;
the second relative refractive index is between 0.32% and 0.38%;
the second radius is between 4.2 µm and 4.8 µm;
each core section further comprises:
an inner cladding region surrounding the outer core region and having a third relative refractive index that is substantially zero, and a third radius between 9 µm and 10 µm, and
an intermediate cladding region surrounding the inner cladding region and having a fourth relative refractive index between −0.26% and −0.34%, and a fourth radius between 13 µm and 15 µm; and
the cladding matrix has a fifth relative refractive index that is substantially zero.

Aspect 20 of the description is:
The multicore optical fiber of Aspect 16, wherein:
the first relative refractive index is between 0.38% and 0.44%;
the first radius is between 2.0 µm and 2.4 µm;
the second relative refractive index is between 0.28% and 0.35%;
the second radius is between 4.2 µm and 4.8 µm;
each core section further comprises:
an inner cladding region surrounding the outer core region and having a third relative refractive index that is substantially zero, and a third radius between 9 µm and 11 µm, and
an intermediate cladding region surrounding the inner cladding region and having a fourth relative refractive index between −0.35% and −0.45%, and a fourth radius between 13 µm and 15 µm; and
the cladding matrix has a fifth relative refractive index between 0.05% and 0.12%.

Aspect 21 of the description is:
The optical fiber of any of Aspects 16-20, wherein the overfilled bandwidth is at least 2 GHz·km at the at least one wavelength in the wavelength range.

Aspect 22 of the description is:
The optical fiber of any of Aspects 16-20, wherein the overfilled bandwidth is at least 5 GHz·km at the at least one wavelength in the wavelength range.

Aspect 23 of the description is:
The optical fiber of any of Aspects 16-20, wherein the overfilled bandwidth is at least 10 GHz·km at the at least one wavelength in the wavelength range.

Aspect 24 of the description is:
The optical fiber of any of Aspects 16-23, wherein the optical fiber has a cable cutoff wavelength $\lambda_C$ between 1160 nm and 1260 nm.

Aspect 25 of the description is:
The optical fiber of any of Aspects 16-24, wherein the optical fiber has a mode-field diameter between 8.0 µm and 10.1 µm at 1310 nm.

Aspect 26 of the description is:
An optical fiber data transmission system comprising:
an optical fiber link comprising the optical fiber of any of Aspects 16-25, wherein the optical fiber link has an input end, an output end and a link length less than 1000 meters;
a transmitter comprising a vertical-cavity surface-emitting laser that emits light having a wavelength in the wavelength range and that carries optical signals at a data rate of at least 10 Gb/s, wherein the vertical-cavity surface-emitting laser is optically coupled to the input end of the optical fiber link; and
a receiver comprising a photodetector optically coupled to the output end of the optical fiber link and configured to receive the optical signals and convert the optical signals to electrical signals.

Aspect 27 of the description is:
The optical fiber data transmission system of Aspect 26, wherein the data rate is at least 25 Gb/s and wherein the link length less than 500 m.

Aspect 28 of the description is:
The optical fiber data transmission system of Aspect 26, wherein the data rate is at least 50 Gb/s and wherein the link length is less than 300 m.

Aspect 29 of the description is:
The optical fiber data transmission system of any of Aspects 26-28, wherein the optical signals are modulated using either a non-return-to-zero modulation format or a four-level pulse-amplitude modulation format.

Aspect 30 of the description is:
A method of transmitting optical data, comprising:
using a vertical cavity surface-emitting laser to generating optical data signals at a data rate of at least 10 Gb/s;
transmitting the optical data signals over an optical fiber link comprising an optical fiber of any of Aspects 16-25; and
receiving the optical signals at a photodetector configured to convert the optical signals into electrical signals representative of the optical signals.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:
1. An optical fiber, comprising:
a core having a step index profile, comprising:
an inner core region having a first relative refractive index and a first radius, and
an outer core region surrounding the inner core region, having a second relative refractive index less than the first relative refractive index, and a second radius greater than the first radius; and
a cladding surrounding the core;
wherein the optical fiber is configured to transmit an optical signal in each core section, and
when the optical signal has a wavelength greater than 1260 nm, the optical fiber is operating in single mode, and
when the optical signal has a wavelength in a range between 800 to 1100 nm, the optical fiber is operating in few mode with an overfilled bandwidth greater than 1 GHz-km of at least one wavelength in the wavelength range.

2. The optical fiber of claim 1, wherein:
the first relative refractive index is between 0.36% and 0.40%;
the first radius is between 2.0 μm and 2.4 μm;
the second relative refractive index is between 0.28% and 0.32%;
the second radius is between 4.2 μm and 4.6 μm; and
the cladding has a third relative refractive index that is substantially zero, and a third radius between 40 μm and 100 μm.

3. The optical fiber of claim 1, wherein:
the first relative refractive index is between 0.38% and 0.44%;
the first radius is between 2.2 μm and 2.8 μm;
the second relative refractive index is between 0.28% and 0.34%;
the second radius is between 4.8 μm and 5.4 μm; and
the cladding comprises:
- an inner cladding region surrounding the outer core region and having a third relative refractive index that is substantially zero, and a third radius between 9 μm and 11 μm, and
- an outer cladding region surrounding the inner cladding region and having a fourth relative refractive index between 0.08% and 0.12%, and a fourth radius between 40 μm and 100 μm.

4. The optical fiber of claim 1, wherein:
the first relative refractive index is between 0.32% and 0.38%;
the first radius is between 2.0 μm and 2.4 μm;
the second relative refractive index is between 0.32% and 0.38%;
the second radius is between 4.2 μm and 4.8 μm; and
the cladding comprises:
- an inner cladding region surrounding the outer core region and having a third relative refractive index that is substantially zero, and a third radius between 9 μm and 10 μm,
- an intermediate cladding region surrounding the inner cladding region and having a fourth relative refractive index between −0.26% and −0.34%, and a fourth radius between 13 μm and 15 μm, and
- an outer cladding region surrounding the inner cladding region and having a fifth relative refractive index that is substantially zero, and a fifth radius between 40 μm and 100 μm.

5. The optical fiber of claim 1, wherein:
the first relative refractive index is between 0.38% and 0.44%;
the first radius is between 2.0 μm and 2.4 μm, and
the second relative refractive index is between 0.28% and 0.35%;
the second radius is between 4.2 μm and 4.8 μm; and
the cladding comprises:
- an inner cladding region surrounding the outer core region and having a third relative refractive index that is substantially zero, and a third radius between 9 μm and 11 μm,
- an intermediate cladding region surrounding the inner cladding region and having a fourth relative refractive index between −0.35% and −0.45%, and a fourth radius between 13 μm and 15 μm, and
- an outer cladding region surrounding the inner cladding region and having a fifth relative refractive index between 0.05% and 0.12%, and a fifth radius between 40 μm and 100 μm.

6. The optical fiber of claim 1, wherein the overfilled bandwidth is at least 5 GHz-km of the at least one wavelength in the wavelength range.

7. The optical fiber of claim 1, wherein the optical fiber has a cable cutoff wavelength kc between 1160 nm and 1260 nm.

8. The optical fiber of claim 1, wherein the optical fiber has a mode-field diameter between 8.0 μm and 10.1 μm at 1310 nm.

9. An optical fiber data transmission system comprising:
- an optical fiber link comprising the optical fiber of claim 1, wherein the optical fiber link has an input end, an output end and a link length less than 1000 meters;
- a transmitter comprising a vertical-cavity surface-emitting laser that emits light having a wavelength in the wavelength range and that carries optical signals at a data rate of at least 10 Gb/s, wherein the vertical-cavity surface-emitting laser is optically coupled to the input end of the optical fiber link; and
- a receiver comprising a photodetector optically coupled to the output end of the optical fiber link and configured to receive the optical signals and convert the optical signals to electrical signals.

10. A method of transmitting optical data, comprising:
- using a vertical cavity surface-emitting laser to generating optical data signals at a data rate of at least 10 Gb/s;
- transmitting the optical data signals over an optical fiber link comprising an optical fiber of claim 1; and
- receiving the optical signals at a photodetector configured to convert the optical signals into electrical signals representative of the optical signals.

* * * * *

UNITED STATES PATENT AND TRADEMARK OFFICE
CERTIFICATE OF CORRECTION

PATENT NO. : 11,467,335 B2
APPLICATION NO. : 16/930811
DATED : October 11, 2022
INVENTOR(S) : Xin Chen et al.

It is certified that error appears in the above-identified patent and that said Letters Patent is hereby corrected as shown below:

On the Title Page

In item (57), in Column 2, in "Abstract", Line 10, delete "at at" and insert -- of at --.

In the Claims

In Column 28, Line 22, in Claim 7, delete "kc" and insert -- $\lambda c$ --.

Signed and Sealed this
Seventh Day of March, 2023

Katherine Kelly Vidal
*Director of the United States Patent and Trademark Office*